US011638965B2

(12) United States Patent
Steinberg et al.

(10) Patent No.: US 11,638,965 B2
(45) Date of Patent: May 2, 2023

(54) SYSTEMS AND METHODS FOR NON-CONTINUOUS DEPOSITION OF A COMPONENT

(71) Applicant: 3D Systems, Inc., Rock Hill, SC (US)

(72) Inventors: Alexander Gabriel Steinberg, Cincinnati, OH (US); Rex Thomas Alexandre, Cincinnati, OH (US)

(73) Assignee: 3D Systems, Inc., Rock Hill, SC (US)

( * ) Notice: Subject to any disclaimer, the term of this patent is extended or adjusted under 35 U.S.C. 154(b) by 95 days.

(21) Appl. No.: 16/837,696

(22) Filed: Apr. 1, 2020

(65) Prior Publication Data

US 2020/0306860 A1 Oct. 1, 2020

Related U.S. Application Data

(60) Provisional application No. 62/827,527, filed on Apr. 1, 2019.

(51) Int. Cl.
*B23K 9/04* (2006.01)
*B33Y 10/00* (2015.01)
(Continued)

(52) U.S. Cl.
CPC ............. *B23K 9/044* (2013.01); *B23K 9/0953* (2013.01); *B23K 9/124* (2013.01); *B23K 9/32* (2013.01);
(Continued)

(58) Field of Classification Search
CPC ........ B23K 9/044; B23K 9/0953; B23K 9/32; B23K 9/124; B23K 9/04; B33Y 50/02; B33Y 40/20
(Continued)

(56) References Cited

U.S. PATENT DOCUMENTS 6,764,168 B1 * 7/2004 Meinhold ................ B41J 2/125
347/81
10,520,923 B2 * 12/2019 Connor .................. B33Y 50/02
(Continued)

FOREIGN PATENT DOCUMENTS

WO WO-2016156020 A1 * 10/2016 ............. B22F 3/105

OTHER PUBLICATIONS

International Search Report and Written Opinion for International Application No. PCT/US2020/026191 dated Aug. 4, 2020; 17 pages.

*Primary Examiner* — Helena Kosanovic
*Assistant Examiner* — Ayub A Maye

(57) ABSTRACT

A method of manufacturing using an additive manufacturing process includes providing a deposition system, the deposition system configured to provide a plurality of cells to form a blank of a part, depositing a first layer of the blank, the first layer comprising a first deposited cell, a second deposited cell spaced apart from the first deposited cell, and a third deposited cell spaced apart from the first deposited cell and the second deposited cell, and depositing a second layer of the part on the first layer, the second layer comprising a fourth deposited cell, a fifth deposited cell spaced apart from the fourth deposited cell, and a sixth deposited cell spaced apart from the fourth deposited cell and the fifth deposited cell. Each of the first layer and the second layer are formed using non-continuous deposition to form the blank.

12 Claims, 9 Drawing Sheets

(51) Int. Cl.
*B33Y 40/20* (2020.01)
*B23K 9/095* (2006.01)
*B23K 9/12* (2006.01)
*B23K 9/32* (2006.01)
*B33Y 50/02* (2015.01)

(52) U.S. Cl.
CPC ............ *B33Y 10/00* (2014.12); *B33Y 40/20* (2020.01); *B33Y 50/02* (2014.12)

(58) Field of Classification Search
USPC .................................. 219/76.1, 76.11, 76.14
See application file for complete search history.

(56) References Cited

U.S. PATENT DOCUMENTS

| | | | | |
|---|---|---|---|---|
| 10,661,341 | B2* | 5/2020 | Romano | B22F 12/70 |
| 2002/0051853 | A1 | 5/2002 | Keicher et al. | |
| 2003/0094441 | A1 | 5/2003 | Dugas et al. | |
| 2003/0153177 | A1 | 8/2003 | Tepman et al. | |
| 2008/0201008 | A1* | 8/2008 | Twelves | G05B 19/4099 700/160 |
| 2010/0150678 | A1 | 6/2010 | Lev et al. | |
| 2011/0156304 | A1* | 6/2011 | Walker | B23P 15/24 264/219 |
| 2013/0206219 | A1* | 8/2013 | Kurtin | H01L 31/078 136/255 |
| 2014/0291886 | A1* | 10/2014 | Mark | B33Y 30/00 264/259 |
| 2014/0330419 | A1 | 11/2014 | Nehme et al. | |
| 2015/0306665 | A1* | 10/2015 | Sidhu | B22F 7/04 427/540 |
| 2016/0319690 | A1 | 11/2016 | Lin et al. | |
| 2016/0343888 | A1* | 11/2016 | Pass | H01L 31/0682 |
| 2017/0087632 | A1* | 3/2017 | Mark | B33Y 10/00 |
| 2017/0197249 | A1* | 7/2017 | Versluys | B33Y 10/00 |
| 2017/0209958 | A1* | 7/2017 | Soshi | B22F 10/20 |
| 2017/0266728 | A1* | 9/2017 | Johnson | B22D 23/003 |
| 2018/0117836 | A1* | 5/2018 | Reese | B29C 64/118 |
| 2018/0243815 | A1* | 8/2018 | Van Bennekom | B22F 3/15 |
| 2018/0326547 | A1 | 11/2018 | Stadtfeld | |
| 2019/0221891 | A1* | 7/2019 | Lockett | H01G 11/46 |
| 2019/0245155 | A1* | 8/2019 | Heath | H01L 51/004 |

\* cited by examiner

SYSTEMS AND METHODS FOR NON-CONTINUOUS DEPOSITION OF A COMPONENT

REFERENCE TO RELATED APPLICATIONS

This application claims the priority benefit of U.S. Provisional Patent App. No. 62/827,527, filed Apr. 1, 2019, which is incorporated herein by reference in its entirety.

TECHNICAL FIELD

Embodiments of the technology relate, in general, to systems and methods for fabricating a component via additive manufacturing using a non-continuous deposition process.

BACKGROUND

Additive manufacturing (AM) has made great strides over the past decade as popular AM processes such as Laser Powder Bed Fusion (LPBF), Electron Beam Melting (EBM), and Selective Laser Sintering (SLS) have transitioned away from strictly high-end R&D projects to a much broader range of productionized applications. While advances in the aforementioned technologies are being made on a frequent basis, they also have their limitations. These common processes have limited build volumes and low deposition rates, sometimes resulting in parts that can take weeks and even months to complete. The high cost of equipment and of the fine-grained powders used in these processes is also a limiting factor in their widespread adoption. The high costs involved have typically limited applications to high performance, lightweight aerospace parts that require intensive and time consuming qualification requirements before a single part can be used for a specific application, further increasing the cost of adoption.

Due to the cost and size limitations inherent in LPBF, EBM, and SLS, a wide range of varying AM modalities based on melting, sintering, or solid-state processing are being developed with the intent to build larger parts at higher deposition rates for a lower cost. Two of the more popular processes currently offered on the market include Directed Energy Deposition (DED) and Wire Arc Additive Manufacturing (WAAM). DED systems are typically expensive and difficult to operate, given that they utilize high-power lasers and complex motion systems such as 5-axis CNC platforms or 6+ axis robotic systems. The material costs associated with DED are also fairly high as the standard feedstock is still a fine powder. Furthermore, 10-50% of all powder used in DED is lost, adding to the cost of each part produced. The WAAM concept was designed to overcome the capital and material costs of DED by utilizing standard arc welding processes such as Gas Metal Arc Welding (GMAW), Gas Tungsten Arc Welding (GTAW), and Plasma Arc Welding (PAW) along with standard weld filler metal in the wire form. Typical WAAM systems are designed around 6-axis welding robots to further reduce costs. Despite the attractive cost and lead time reduction of a robot over a CNC platform for both DED and WAAM, the dynamic accuracy of robotic systems while following a toolpath is limited, increasing the likelihood of manufacturing defects such as lack of fusion. While WAAM successfully combats the capital and material cost issues of DED, it is faced with poorer surface finishes along with higher heat inputs and residual stresses as deposition rates increase.

Even if the cost issue can be eliminated by selecting WAAM over DED, one of the most pressing issues limiting the widespread adoption of all large scale AM processes is that of toolpath generation and motion control. Existing slicing software and toolpath generation methods for large scale AM are focused primarily on either the generation of simplistic shapes, or are developed for very specific geometric applications. A "universal" slicer does not yet exist, and thus programmers and machine operators can thus be forced to spend days or weeks writing code to run large scale AM machines. Once code has been written and is ready for implementation on the factory floor, finding skilled operators familiar with both CNC or robot-based codes and the deposition process can be incredibly difficult, often resulting in higher personnel costs to run machines as engineers are utilized instead of technicians. As additive manufacturing continues to mature, the need for a simple and robust, high throughput, low-cost machine must be met before AM fully revolutionizes manufacturing around the world. As cost is reduced and accessibility is increased, AM will make its way into low-criticality applications with ease, thus increasing the adoption rate of the technology worldwide.

SUMMARY

In an embodiment, a method of manufacturing using an additive manufacturing process includes providing a deposition system, the deposition system configured to provide a plurality of cells to form a blank of a part, depositing a first layer of the blank, the first layer comprising a first deposited cell, a second deposited cell spaced apart from the first deposited cell, and a third deposited cell spaced apart from the first deposited cell and the second deposited cell, and depositing a second layer of the part on the first layer, the second layer comprising a fourth deposited cell, a fifth deposited cell spaced apart from the fourth deposited cell, and a sixth deposited cell spaced apart from the fourth deposited cell and the fifth deposited cell. Each of the first layer and the second layer are formed using non-continuous deposition to form the blank.

In an embodiment, a method of manufacturing using an additive manufacturing process includes providing a welding system, the welding system configured to provide a plurality of metal cells to form a metal blank of a metal part, depositing a first layer of the metal blank, the first layer comprising a first deposited cell, a second deposited cell spaced apart from the first deposited cell, and a third deposited cell spaced apart from the first deposited cell and the second deposited cell, and depositing a second layer of the metal part on the first layer, the second layer comprising a fourth deposited cell, a fifth deposited cell spaced apart from the fourth deposited cell, and a sixth deposited cell spaced apart from the fourth deposited cell and the fifth deposited cell. Each of the first layer and the second layer are formed using non-continuous deposition to form the metal blank.

In an embodiment, a method of manufacturing using an additive manufacturing process includes providing a deposition system, the deposition system configured to provide a plurality of cells to form a blank of a part, depositing a first layer of the blank, the first layer comprising a plurality of first layer deposited cells, wherein each of the plurality of first layer deposited cells is formed using non-continuous deposition, and depositing a second layer of the blank on the first layer, the second layer comprising a plurality of second layer deposited cells, wherein each of the plurality of second layer deposited cells is formed using non-continuous deposition. The method further includes machining the blank to form the part.

In an embodiment, a method of manufacturing using an additive manufacturing process includes providing a welding system comprising an articulated robot, a weld gun coupled to the robot, and a controller operably coupled with the robot, the welding system operably configured to provide a plurality of substantially cylindrical cells to form a blank of a part. The method further includes depositing a first layer of the blank, the first layer comprising a plurality of first layer deposited cells, wherein each of the plurality of first layer deposited cells is formed using non-continuous deposition in a first pattern, depositing a second layer of the blank on the first layer, the second layer comprising a plurality of second layer deposited cells, wherein each of the plurality of second layer deposited cells is formed using non-continuous deposition and has a second pattern, wherein the first pattern differs from the second pattern, and machining the blank to form the part.

In an embodiment, a blank of a part is made using a non-continuous deposition process.

In an embodiment, a method of providing an order of deposition for use in a non-continuous deposition process includes providing a computer model for a part, slicing the computer model into layers, and generating a plurality of cells to fill each of the layers, wherein each cell of the plurality of cells corresponds to a deposited cell to be deposited in the non-continuous deposition process. The method further includes sorting the plurality of cells associated with each of the layers based on one or more heuristics to create a plurality of sorted lists, wherein each of the sorted lists is associated with a separate layer of the layers, and combining the plurality of sorted lists to form a list of cells, wherein the list of cells provides the order of deposition in the non-continuous deposition process to form a blank of the part.

In an embodiment, the blank of a part is made according to the non-continuous deposition process using the order of deposition provided as described herein.

BRIEF DESCRIPTION OF THE DRAWINGS

Various embodiments will become better understood with regard to the following description, appended claims and accompanying drawings wherein:

DETAILED DESCRIPTION

Figure 1:
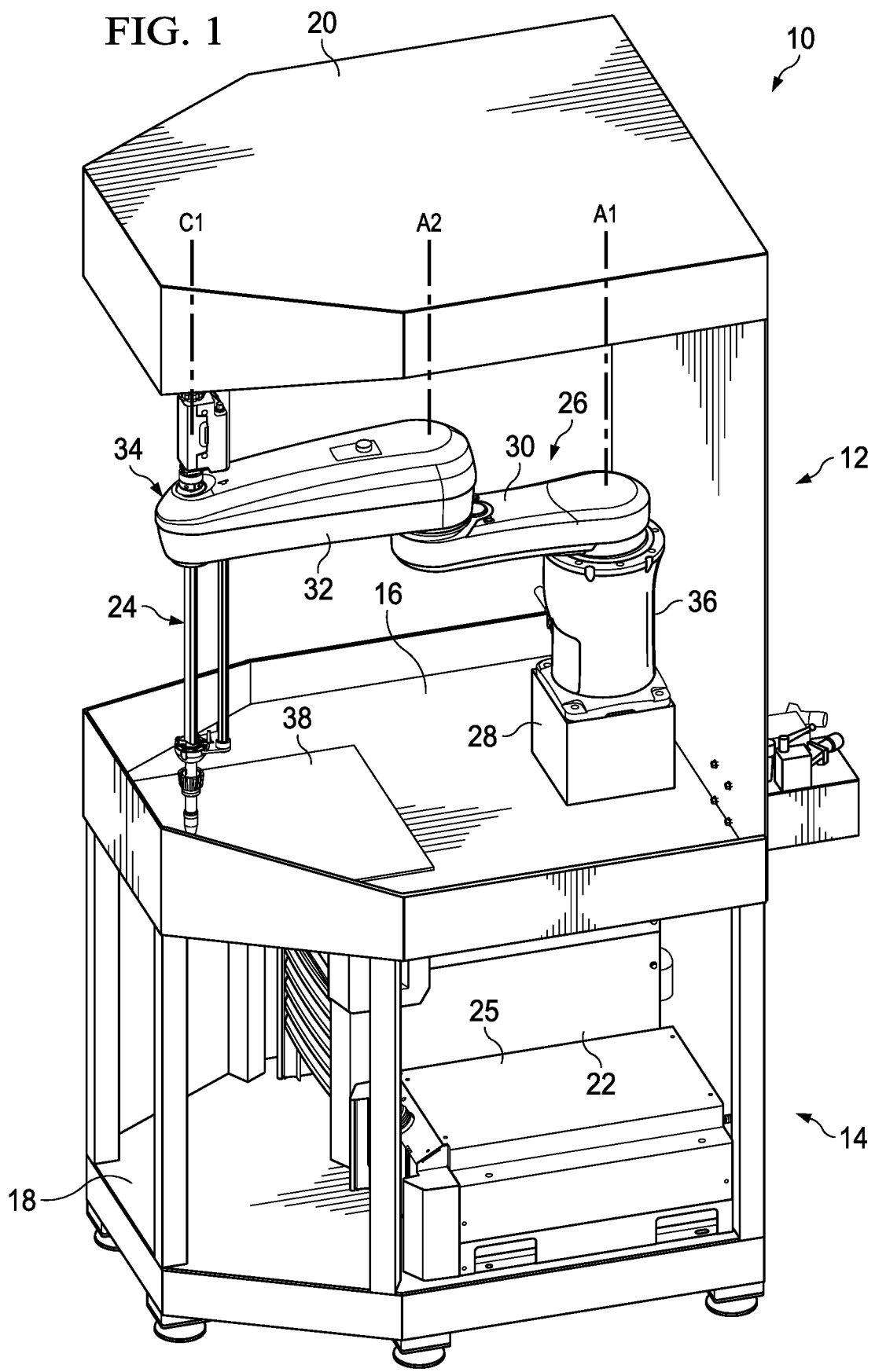
FIG. 1 is a right isometric view depicting a fabrication system, in accordance with one embodiment.

Various non-limiting embodiments of the present disclosure will now be described to provide an overall understanding of the principles of the structure, function, and use of the apparatuses, systems, methods, and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Described herein are example embodiments of apparatuses, systems, and methods for making a component via additive manufacturing with non-continuous deposition. The component may be a blank for a part. In one example embodiment, software for toolpath generation takes a 3D model and fills it with a series of layers of hexagonally packed cells that create the complete volume of the given part. The cells are then sorted to build a toolpath consisting of a series of discrete deposition events (i.e., each event corresponds to a single deposited cell). In some embodiments, the cells are sorted to allow for rapid traversals between the discrete deposition events in an order that is designed to maximize deposition rates while residual stress and distortion are minimized by controlling heat input throughout the part. As used herein, references to modeled cell(s) or cell(s) refer to the discrete unit making up the cellular model, which is used to create an order of the discrete deposition events during the non-continuous deposition process, as discussed further below. Each cell is associated with a deposited cell to be deposited during the non-continuous deposition process. As used herein, deposited cell(s) refers to the individual physical depositions that form the blank of a part or the part. Costs are reduced and industrial reliability is maintained by utilizing a variant of the standard GMAW process to build each deposited cell until they are joined together and form the final part. The non-continuous, discrete deposition nature of the process allows for modular scalability of machines without interference in the process or build quality.

In various embodiments, the component formed using a non-continuous deposition process as described herein can be understood to be a "blank" that is further milled or otherwise shaped into a final part. By fabricating the component using the deposited cell-by-deposited cell, layer-by-layer process described herein, the resultant blank can have a configuration that roughly resembles the final part, but does not have the associated cost and complexity associated with conventional metal additive manufacturing processes such as, for example, conventional Directed Energy Deposition (DED), Laser Powder Bed Fusion (LPBF), Electron Beam Melting (EBM), and Selective Laser Sintering (SLS). The deposited cell-by-deposited cell, layer-by-layer process can replace rough machining operations carried out on large billets and bar stock that are costly and time consuming. Solely machining a final product from bar stock may be sub-optimal and, likewise, generating a final part using only conventional metal additive manufacturing may also be sub-optimal.

The examples discussed herein are examples only and are provided to assist in the explanation of the apparatuses, devices, systems and methods described herein. None of the features or components shown in the drawings or discussed below should be taken as mandatory for any specific implementation of any of the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

In general, it will be apparent to one of ordinary skill in the art that at least some of the embodiments described herein can be implemented in many different embodiments of software, firmware, and/or hardware. The software and firmware code can be executed by a processor or any other similar computing device. The software code or specialized control hardware that can be used to implement embodiments is not limiting. For example, embodiments described herein can be implemented in computer software using any suitable computer software language type, using, for example, conventional or object-oriented techniques. Such software can be stored on any type of suitable computer-readable medium or media, such as, for example, a magnetic or optical storage medium. The operation and behavior of the embodiments can be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes described herein can be executed by programmable equipment, such as computers or computer systems and/or processors. Software that can cause programmable equipment to execute processes can be stored in any storage device, such as, for example, a computer system (nonvolatile) memory, an optical disk, magnetic tape, or magnetic disk. Furthermore, at least some of the processes can be programmed when the computer system is manufactured or stored on various types of computer-readable media.

It can also be appreciated that certain portions of the processes described herein can be performed using instructions stored on a computer-readable medium or media that direct a computer system to perform the process steps. A computer-readable medium can include, for example, memory devices such as diskettes, compact discs (CDs), digital versatile discs (DVDs), optical disk drives, or hard disk drives. A computer-readable medium can also include memory storage that is physical, virtual, permanent, temporary, semi-permanent, and/or semi-temporary.

A "computer," "computer system," "host," "server," or "processor" can be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein can include memory for storing certain software modules used in obtaining, processing, and communicating information. It can be appreciated that such memory can be internal or external with respect to operation of the disclosed embodiments. The memory can also include any means for storing software, including a hard disk, an optical disk, floppy disk, ROM (read only memory), RAM (random access memory), PROM (programmable ROM), EEPROM (electrically erasable PROM) and/or other computer-readable media. Non-transitory computer-readable media, as used herein, comprises all computer-readable media except for a transitory, propagating signals.

Figure 2:
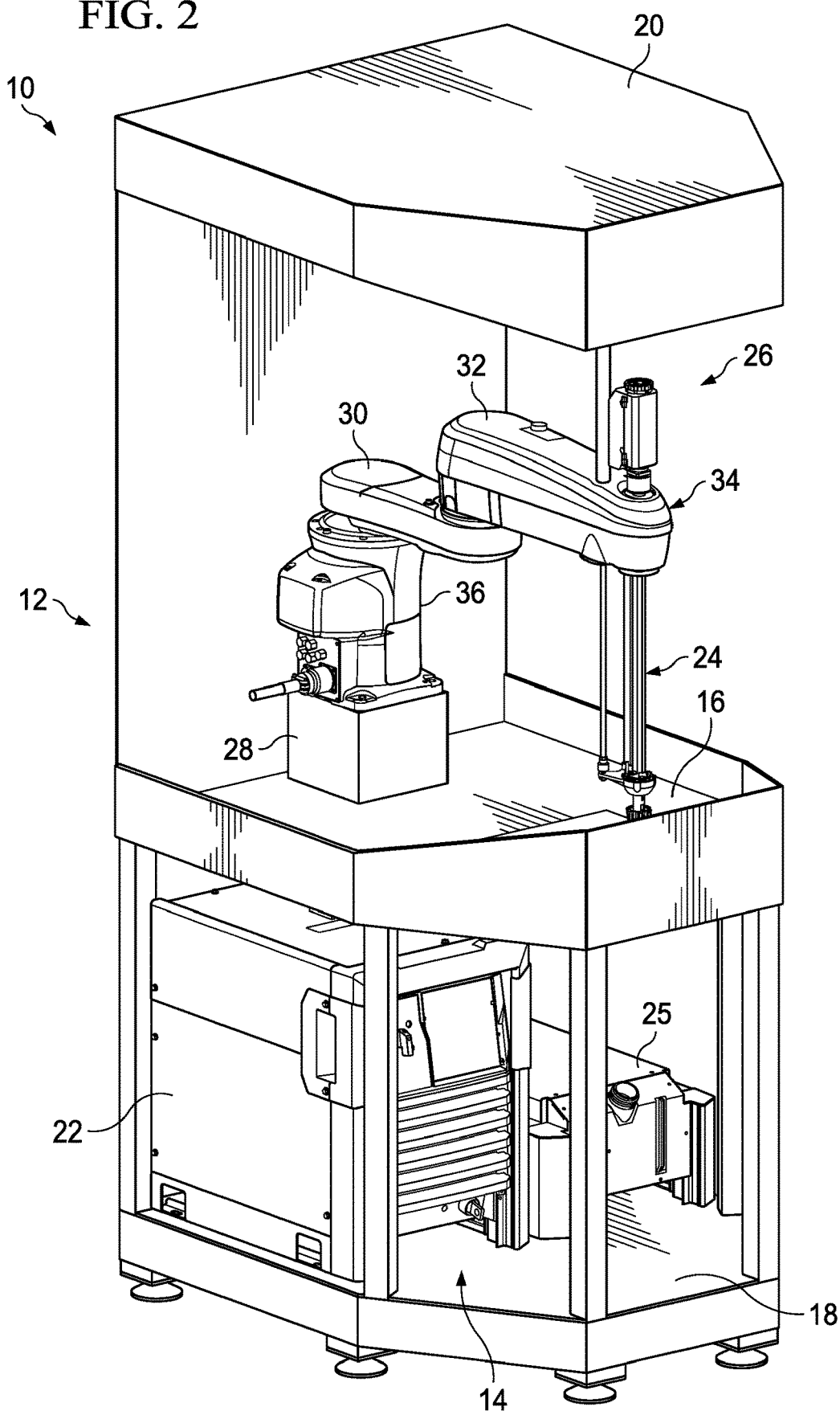
FIG. 2 is a left isometric view depicting the fabrication system of FIG. 1.

Embodiments are hereinafter described in detail in connection with the views and examples of FIGS. 1-13, wherein like numbers indicate the same or corresponding elements throughout the views. A fabrication system 10 is generally depicted in FIGS. 1 and 2 and can facilitate fabrication of a metal component via additive manufacturing, as will be described in further detail below. The fabrication system 10 can include a frame assembly 12 and a deposition system, such as welding system 14. The frame assembly 12 can include a welding table 16, a lower shelf 18 disposed beneath the welding table 16, and a hood 20 disposed above and extending over the welding table 16. In one embodiment, the frame assembly 12 can be formed of steel, but in other embodiments, the frame assembly 12 can be formed of any of a variety of suitable alternative materials, such as other metals, plastics, and/or composites, such as epoxy-granite.

The welding system 14, which can be for example any suitable deposition system, can include a welding machine 22 and a weld gun 24 that is coupled to the welding machine 22 via a cable assembly (not shown). The welding system 14 can include a chiller 25. The welding machine 22 can selectively feed welding wire to the weld gun 24 (via the cable assembly) as part of a welding process, as is commonly understood in the art. It is to be appreciated that the welding machine 22 and the weld gun 24 can be configured to accommodate any of a variety of suitable welding processes, such as, for example, Gas Metal Arc Welding (GMAW), Gas Tungsten Arc Welding (GTAW), and Plasma Arc Welding (PAW).

The weld gun 24 can be coupled with an articulated robot 26 that is disposed on the frame assembly 12 or welding table 16 beneath the hood 20. In an embodiment, the welding machine is configured to begin feeding the welding wire through the weld gun 24 while the articulated robot 26 is moving. In this manner, the tip of the welding wire may be in the appropriate position to begin arc initiation as the weld gun 24 reaches the next weld location. For example, the initiation time may be from 10 milliseconds to 100 milliseconds and the movement time may be from 50 milliseconds to 900 milliseconds, such that combining the initiation phase with the movement phase may reduce the overall time required for the overall weld. The arc initiation can begin simultaneously or immediately after the articulated robot 26 completes the movement of the weld gun 24. During the welding process, welding gasses emitted from the weld gun 24 can be at least partially collected by the hood 20. In one embodiment, a fume extraction system (not shown) can be associated with the hood 20 and can facilitate extraction of the welding gases from the welding table 16. In another embodiment, welding gases may be recirculated in an enclosed chamber in order to maintain an inert atmosphere.

During the welding process, the articulated robot 26 can facilitate selective positioning of the weld gun 24 relative to the welding table 16. In one embodiment, as illustrated in FIGS. 1 and 2, the articulated robot 26 can comprise a Selective Compliance Articulated Robot Arm (SCARA) robot that includes a base 28, a first arm 30, and a second arm 32. The base 28 can be coupled with the frame assembly 12 or the welding table 16. The first arm 30 can be pivotally coupled with the base 28 and pivotable with respect to the base 28 about a first axis A1. The second arm 32 can be pivotally coupled with the first arm 30 (at an end opposite the base 28) and pivotable with respect to the first arm 30 about a second axis A2. Each of the first and second arms 30, 32 can accordingly be pivoted about the first and second axes A1, A2, respectively, to move the weld gun 24 laterally along the welding table 16 (e.g., in an X-Y direction). It will be appreciated that the articulated robot can include any suitable components or features to facilitate movement about additional axes such as, for example, by providing a rotating wrist joint (not shown) that can rotate about a Z-axis. The articulated robot 26 may also include a mount (not shown) on the distal end thereof to provide a 5th controlled axis allowing for an azimuth-elevation tool axis control. The weld gun 24 also can be slidably coupled with a distal end 34 of the second arm 32 and slidable along a centerline C1 such that the weld gun 24 is moveable vertically with respect to the welding table (e.g., in a Z direction). The articulated robot 26 can accordingly provide three degrees of freedom for the weld gun 24. In another embodiment, the welding table 16 can include a rotisserie or trunnion (not shown) to facilitate printing on cylindrical components as the cylindrical components are rotated about an axis.

In one embodiment, each of the weld gun 24, the first arm 30, and the second arm 32 can be associated with respective servos (not shown) that can be independently controlled to move the weld gun 24, the first arm 30, and the second arm 32 relative to each other. In other embodiments, any of a variety of suitable alternative electronic actuators can be used to facilitate automated movement of the weld gun 24, the first arm 30, and the second arm 32. It is to be appreciated that although the articulated robot 26 is illustrated and described above to be a SCARA robot, any of a variety of suitable alternative robot arrangements are contemplated for positioning the weld gun 24 relative to the welding table 16 (e.g., a delta robot, 6-axis robot arm, or gantry machine). The time it takes the articulated robot 26 to move the weld gun 24 may vary. In some embodiments, the move time may be in a range of 0.01 s to 100 s, 0.01 s to 50 s, 0.01 s to 10 s, 0.01 s to 1 s, 0.01 s to 0.5 s, 0.1 s to 0.5 s, 0.1 s to 1 s, 0.1 to 10 s, 0.1 s to 100 s, 0.5 s to 1 s, 0.5 s to 10 s, 0.5 s to 100 s, 1 s to 10 s, 1 s to 50 s, or 1 s to 100 s. In an embodiment, the articulated robot 26 may move from 1 m/min to 60 m/min.

Still referring to FIGS. 1 and 2, the welding system 14 can include a controller 36 that is associated with the welding machine 22, the weld gun 24, and the articulated robot 26. While the controller 36 is shown in connection with the articulated robot 26, the controller 36 may be a separate component (e.g., in an electrical cabinet (not shown)). The controller 36 can facilitate control of the welding process (via the welding machine 22 and/or the weld gun 24) and the operation of the articulated robot 26 to fabricate a three-dimensional component on the welding table 16 via additive manufacturing, as will be described in further detail below. The controller 36 can include native software that can provide instructions to the welding machine 22 and the articulated robot 26 based upon an input from a user (via a control panel or a computer model). In one embodiment, the controller 36 can be a general purpose computer but, in other embodiments, the controller 36 can be any of a variety of suitable alternative controller arrangements for controlling the welding process and operation of the articulated robot 26.

The welding machine 22 and the controller 36 are shown to be disposed on the lower shelf 18 beneath the welding table 16. A spool or container of welding wire (not shown) can also be provided on the lower shelf 18. By arranging each of these components on the frame assembly 12, the fabrication system 10 can be a self-contained unit that is easily transportable. In one embodiment, the frame assembly 12 can have an overall length and width that is similar to a standard pallet (e.g., about 40 inches by about 48 inches) to enable the fabrication system 10 to be easily transported with pallet moving equipment, such as a pallet jack or a forklift, for example.

Figure 3:
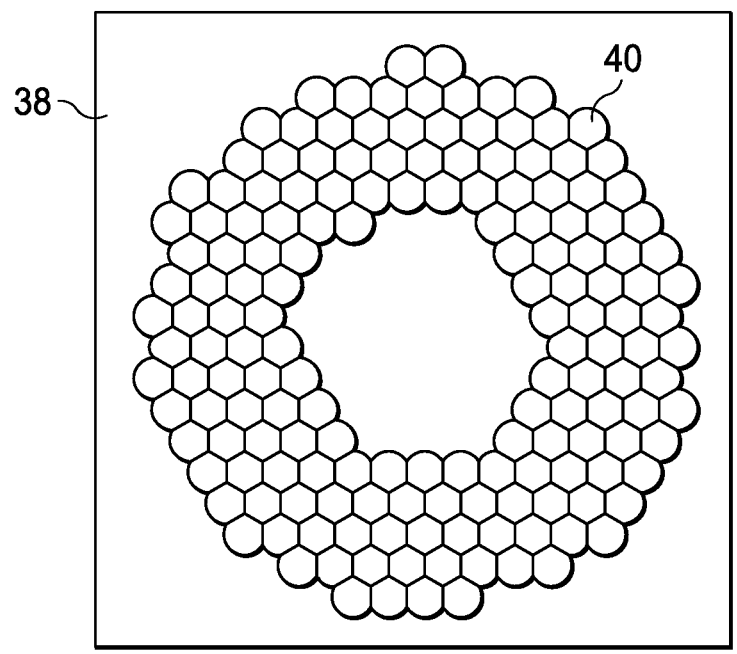
FIG. 3 is a top plan view of a component layer deposited in accordance with an embodiment.

Referring now to FIG. 3, the welding system 14 can fabricate a metal component on a weld plate 38 by depositing a plurality of deposited cells 40 on the weld plate 38. During the welding process, the substrate (e.g., weld plate 38) may be preheated to a desired temperature. In some embodiments, the preheat temperature may be in a range of 0° C. to 1000° C., 0° C. to 750° C., 0° C. to 500° C., 0° C. to 250° C., 10° C. to 1000° C., 10° C. to 500° C., 20° C. to 1000° C., 20° C. to 500° C., 50° C. to 1000° C., or 50° C. to 500° C. Each consecutive deposited cell 40 that is deposited on the weld plate 38 can be spaced from the deposited cell 40 that was previously deposited. For example, the deposited cells 40 can be deposited in a non-continuous manner (i.e., where a continuous manner of deposition would be placing the next deposited cell 40 directly adjacent the previous deposited cell 40). Deposited cells rapidly placed in close proximity can result in a propensity to agglomerate and become asymmetric. By depositing the deposited cells 40 in a non-continuous manner, each particular deposited cell 40 can be allowed to properly cool before another deposited cell 40 is deposited thereon. The approach can enhance the bonding between the deposited cells 40 and distribute the heat input across the metal component to reduce the likelihood for imperfections in the metal component.

The welding parameters may vary. In some embodiments, the voltage applied may be in a range of 10 V to 40 V, 10 V to 30 V, 10 V to 20 V, 15 V to 25 V, 15 V to 35 V, 20 V to 30 V, 20 V to 40 V, or 30 V to 40 V. Various embodiments can include an applied current of 10 A to 1000 A, 10 A to 500 A, 10 A to 250 A, 10 A to 100 A, 100 A to 250 A, 100 A to 400 A, 100 A to 500 A, 100 A to 750 A, 250 A to 500 A, 250 A to 750 A, 500 A to 750 A, or 500 A to 1000 A. The duty cycle may be in a range of 0% to 100%, 25% to 100%, 25% to 90%, 25% to 75%, 40% to 100%, 40% to 90%, or 40% to 75%. The length of the unmelted wire extending from the weld gun (wire stick out) and wire feed rate may vary. In some embodiments, the wire stick out may be in a range of 1 mm to 50 mm, 1 mm to 40 mm, 1 mm to 30 mm, 1 mm to 20 mm, 5 mm to 50 mm, 5 mm to 35 mm, 10 mm to 50 mm, 10 mm to 40 mm, 10 mm to 30 mm, 10 mm to 25 mm, 12 mm to 25 mm, 15 mm to 25 mm, 15 mm to 35 mm, 20 mm to 40 mm, or 20 mm to 30 mm. In various embodiment, the wire feed rate (inches per minute) may be in a range of 10 to 1500, 10 to 1250, 10 to 1000, 10 to 500, 50 to 1500, 50 to 1000, 50 to 500, 100 to 1500, 100 to 1250, 100 to 750, 100 to 500, 100 to 250, 250 to 1250, 250 to 1000, 250 to 500, 500 to 1500, 500 to 1000, 750 to 1500, 1000 to 1500. Additionally, the arc-on time may vary and, in some embodiments, can be in a range of 0.01 s to 100 s, 0.01 s to 50 s, 0.01 s to 10 s, 0.01 s to 1 s, 0.1 s to 100 s, 0.1 s to 50 s, 0.1 s to 10 s, 0.1 s to 1 s, 0.2 s to 100 s, 0.2 s to 50 s, 0.2 s to 10 s, 0.2 s to 1 s, 0.5 s to 50 s, 0.5 s to 10 s, 1 s to 100 s, 1 s to 10 s, 5 s to 100 s, or 10 s to 100 s. Further, the build rate may be in a range from, for example, 0.1 lb/hr to 1000 lb/hr, 0.1 lb/hr to 500 lb/hr, 0.1 lb/hr to 100 lb/hr, 0.1 lb/hr to 50 lb/hr, 0.1 lb/hr to 10 lb/hr, 0.5 lb/hr to 10 lb/hr, 0.5 lb/hr to 50 lb/hr, 0.5 lb/hr to 100 lb/hr, 1 lb/hr to 10 lb/hr, or 1 lb/hr to 50 lb/hr. Distortion in the deposited component may be affected by amperage, duty cycle required to hit each deposition rate. Distortion may be reduced or minimized using the non-continuation deposition process, as discussed below in Example 4. Large wire diameters (e.g., 0.045-0.062") with high amperage and duty cycles (e.g., move speeds in excess of 20-30 m/min) may be capable of achieving high deposition rates while minimizing distortion. Machine X-Y area may not have a large impact on deposition rates compared to travel speeds, but it may affect heated bed requirements and inert gas consumption. Larger machine areas may require higher duty cycles in order to achieve higher deposition rates.

In various embodiments, the welding system 14 can provide an inert shielding gas during the fabrication of the metal component. The inert shielding gas prevents oxidation of the molten metal, which could otherwise create voids, defects, or discontinuities in the final product. Examples of the inert shielding gas include, without limitation, argon, carbon dioxide ($CO^2$), helium, nitrogen, oxygen, and combinations thereof. The welding system 14 can include an inert shielding gas source (e.g., a gas tank) or may be coupled to a central supply if one is available. Multiple techniques may be used to deliver the inert shielding gas, as discussed below, and more than one technique may be used at a time. An example embodiment includes delivery of the inert shielding gas via a GMAW nozzle. The GMAW nozzle produces a laminar flow of inert shielding gas directly above each deposited cell 40 as it is welded. The deposited cell 40 is still red hot as the gas delivery nozzle moves away towards the next deposited cell 40 to be welded, which may still allow oxidation. The deposition method may vary. For example, the GMAW process has multiple modes: short circuit, globular, spray, or pulsed. The short circuit mode results in a low heat input, which could result in faster depositions. The globular mode results in large amounts of spatter. The spray mode has a high heat input, which may eliminate lack of fusion but can result in overheating the component, which may be addressed by techniques discussed further below. In an embodiment, a combination of these modes may be used to build one component depending on the component geometry and requirements.

In another embodiment, the welding system 14 can include delivery of the inert shielding gas via a gas diffusing lens. The gas diffusing lens creates a relatively large area of slow-moving inert shielding gas that displaces oxygen around a portion of the metal component. The diameter of the gas diffusing lens may vary based on, for example, the overall size of the metal component, the average robot move time between deposited cells 40, the raw material used, and the overall temperature of the metal component.

In another embodiment, the fabrication system 10 can include welding the metal component in a bath of the inert shielding gas. The fabrication system 10 can include a chamber having a bottom surface and a sidewall extending up from the bottom surface. In an embodiment, the bottom surface of the chamber may be the welding table 16. The chamber includes an inlet in either the bottom surface or at about the bottom of the sidewall. The inert shielding gas may be delivered to the bottom of the chamber through the inlet. The inert shielding gas, which is heavier than air, displaces the air previously at the bottom of the chamber. As the chamber fills with the inert shielding gas, the air is pushed up and over the sidewall. After the air has been expelled from the chamber, the welding may proceed. In an embodiment, the bath of the inert shielding gas may be used in conjunction with a GMAW nozzle or a gas diffusing lens as described above.

In another embodiment, the fabrication system 10 can include an enclosed inert environment surrounding the metal component as it is being welded. The fabrication system 10 can include a chamber having a bottom surface, a top surface, and a sidewall extending between the bottom surface and the top surface. The interior of the chamber may be filled with the inert shielding gas and pressurized above the ambient barometric pressure. The positive pressure differential with respect to the ambient environment prevents oxygen-rich air from interfering with the welding.

Figure 4:
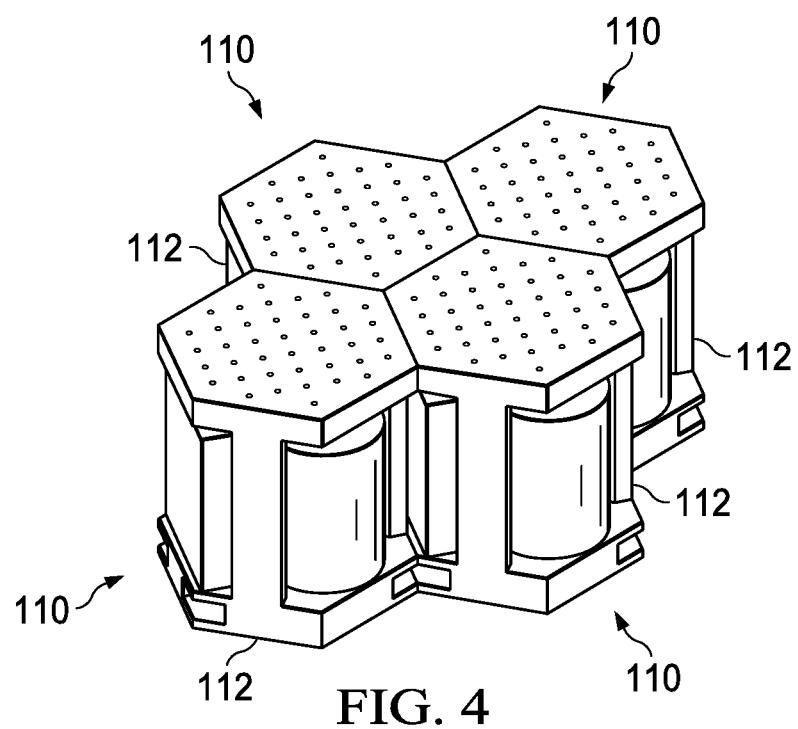
FIG. 4 is an isometric view of a plurality of fabrication systems in accordance with another embodiment.

FIG. 4 illustrates an alternative embodiment that includes a plurality of fabrication systems 110 that are each respectively similar to, or the same in many respects as, the fabrication system 10 illustrated in FIGS. 1 and 2. For example, each of the fabrication systems 110 include a frame assembly 112 and a welding system (not shown). However, the frame assemblies 112 can have an overall hexagonal shape that provides for modularity among the fabrication systems 110. As such, two or more of the fabrication systems 110 can fit together in a honeycomb-type arrangement and can cooperate together to fabricate a metal component that is otherwise too large to fabricate using only one of the fabrication systems 110. A hexagonal machine shape allows for a variety of configurations of multiple fabrication systems 110 working in conjunction with one another to linearly scale build area and deposition rate. A scaffolding or support structure (not shown) may be positioned above the modular frame assemblies 112 to provide support for the welding system. The modular fabrication systems 110 may include synchronized or unsynchronized Z-motion.

Figure 5A:
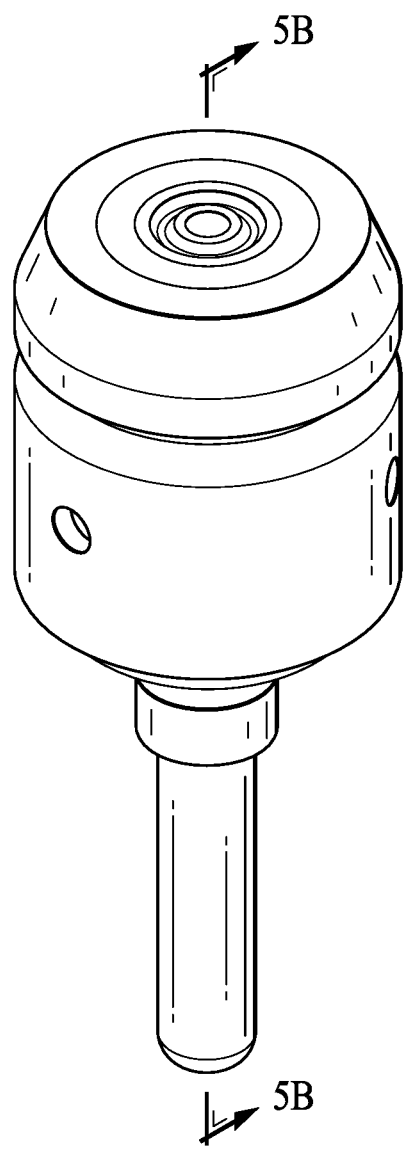
FIGS. 5A and 5B are an isometric view and a cross-sectional view of a contact tip in accordance with another embodiment.
Figure 5B:
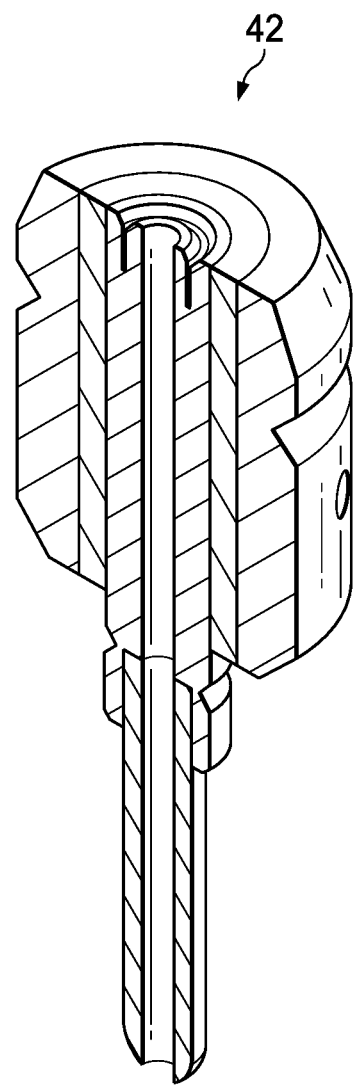

The weld gun 26 may include an end effector designed for the discontinuous deposition architecture as described herein. Traditional welding torches are often too heavy (e.g., in excess of 3 kg) to allow rapid acceleration required for high travel speed of process and do not allow for a simple automated contact tip change during processing. The end effector 42 shown in FIGS. 5A and 5B is designed to weigh less than 1 kg, and can be grabbed with a quick-release collet mechanism for rapid contact tip changes. The welding system may include a carousel of replacement contact tips (not shown) ready to be swapped out as needed. Damage in the event of a machine crash can be mitigated by a notched section located immediately above the contact tip threads. In the event that component temperatures increase the ambient temperature inside the machine significantly, the welding system can include a water-cooled heat exchanger mounted to the exterior of the collet body.

Figure 6:
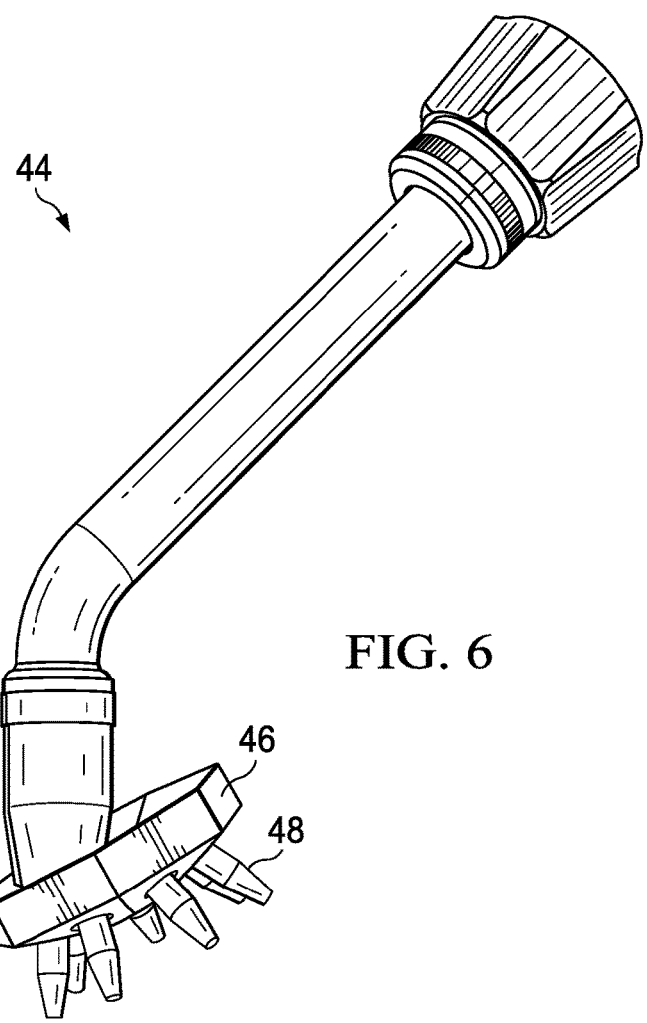
FIG. 6 is a isometric view of a rotatable housing including multiple contact tips in accordance with another embodiment.

Referring to FIG. 6, an example embodiment of a contact tip exchanger 44 includes a rotating housing 46 holding more than one contact tip 48. In an embodiment, the rotating housing 46 may hold seven contact tips 48. The rotating housing 46 will rotate, or index, to a new contact tip 48 at predetermined intervals. In various embodiments, the predetermined intervals may be based on, for example, the number of deposited cells produced by each tip or a measure of remaining useful life determined elsewhere in the machine. The contact tip exchanger can include a shearing mechanism (not shown) to trim the welding wire as the rotating housing rotates. Accordingly, the trimmed wire remaining in the current contact tip rotates away from the welding wire extending from the welding wire source (e.g., spool or container). The free end of the welding wire is then fed through the new contact tip after the rotating housing has finished rotating. The contact tip exchanger 44 increases the run time of the welding machine 22 without intervention.

In an embodiment, the welding machine 22 may include a multi-tip end effector. In an embodiment, the end effector may include three tips. The triple-tip end effector can include three welding contact tips positioned along the perimeter of a circle, spaced at 120 degrees apart such that each contact tip is able to produce a deposited cell within the sorting pattern at the same time within one robot movement. In another embodiment, the multi-tip end effector could be used in a multi-material configuration in which each contact tip on the end effector could hold a welding wire of a different material.

Figure 7:
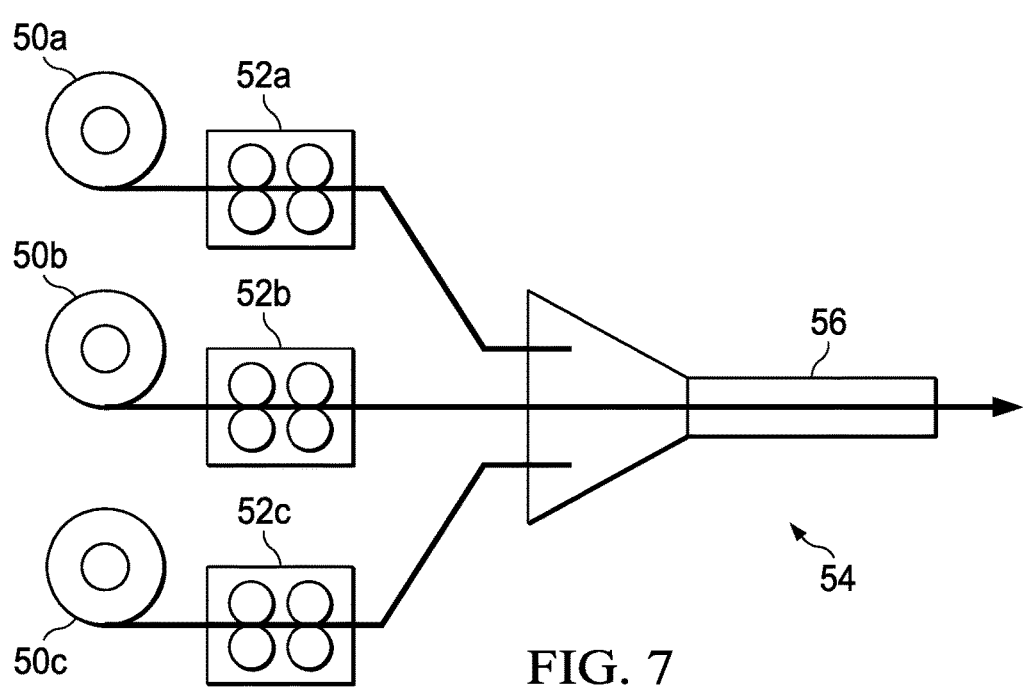
FIG. 7 depicts an end effector capable associated with more than one wire feeder in accordance with another embodiment.

In some embodiments, multi-material components can be produced by integrating multiple wires into a single system. For example, the welding system 14 may include a single end effector capable of producing deposited cells from welding wire extending from more than one wire feeder. Referring to FIG. 7, in an embodiment including three separate material sources 50a, 50b, 50c, three feeders 52a, 52b, 52c may be used. The welding wire extending from each feeder 52a, 52b, 52c extends into a guide 54. The guide 54 may be, for example, shaped like a funnel and may be metallic. The first welding wire to be used is fed through the neck 56 of the guide 54 and out of the end effector. To change materials, the first welding wire is retracted from the neck 56 of the guide 54, and the welding wire of the desired material is fed through the neck 56 and out of the end effector.

Figure 8:
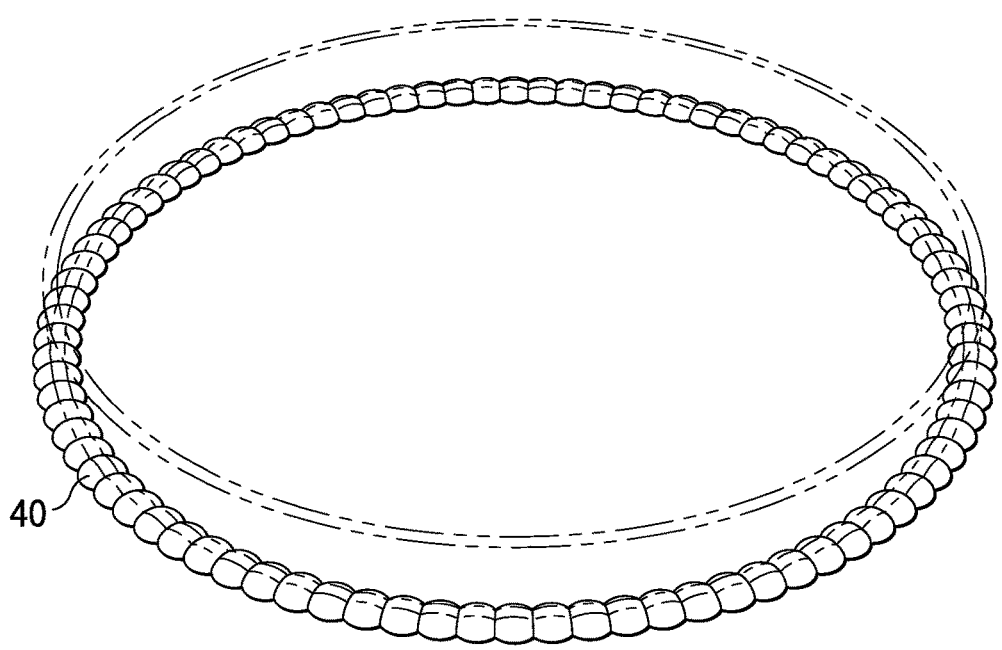
FIG. 8 is an isometric view of a component layer deposited in accordance with an embodiment.
Figure 9:
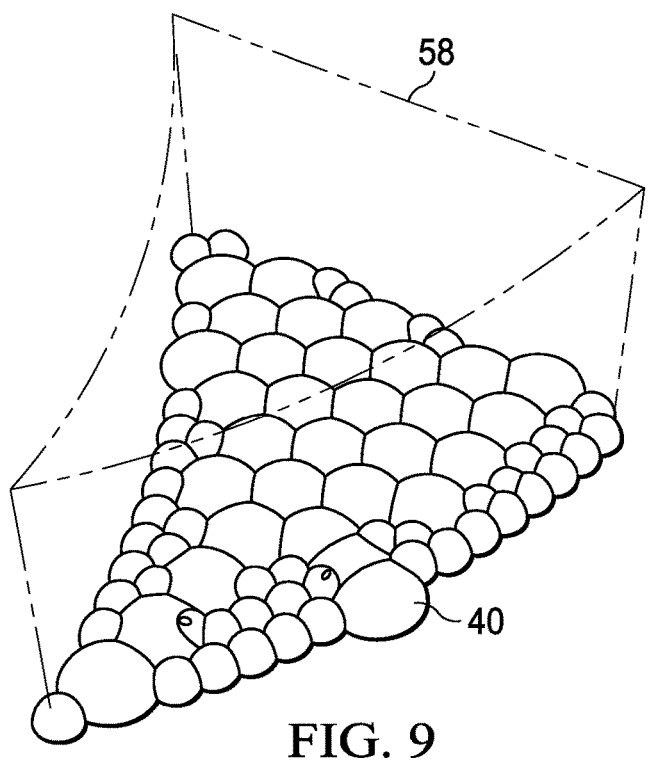
FIG. 9 is an isometric view of a component layer having deposited cells of varying sizes in accordance with an embodiment.

The deposited cells 40 deposited on the weld plate 38 can be provided in the pattern illustrated in FIG. 3 using non-continuous deposition. To achieve this pattern, a first layer of deposited cells 40 can first be disposed on the weld plate in a matrix-type arrangement where each deposited cell 40 is spaced substantially equidistant from adjacent deposited cells 40. Each subsequent layer of deposited cells 40 that is added can be deposited in a similar manner relative to the underlying layer until the metal component is formed. In an embodiment, the matrix-type arrangement of each layer is a hexagonal grid. In another embodiment, as shown in FIG. 8, a layer can have deposited cells 40 that are not arranged in a matrix or grid. Such a layer may be used, for example, where thin walls or portions of a component exist. In another embodiment, as shown in FIG. 9, the deposited cells 40 could be arranged with some flexibility in the overlap of adjacent deposited cells 40, or the diameter of the deposited cells 40 to more closely match the net shape of the component 58 or help optimize some aspect of component formation. In one embodiment, a portion of the welding table 16 disposed beneath the weld plate 38 can be selectively retracted towards the lower shelf 18 to accommodate larger metal components. Further, the welding table 16 or the articulated robot 26 may be configured to move down or up, respectively, to allow more room for the welding process after each layer is completed.

Figure 10A:
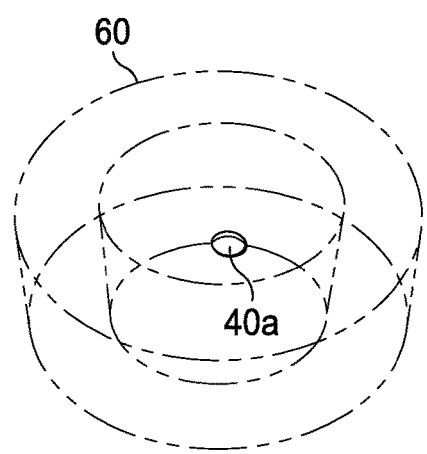
FIGS. 10A-10G are isometric views of a component layer as it is being deposited in accordance with an embodiment.
Figure 10B:
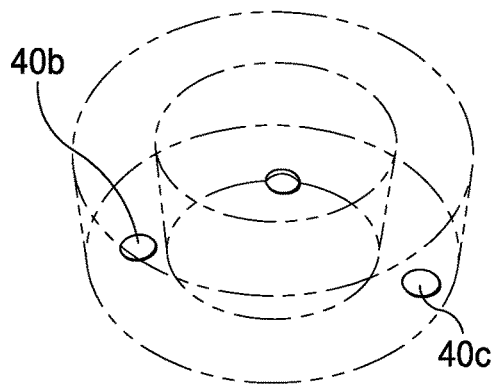
Figure 10C:
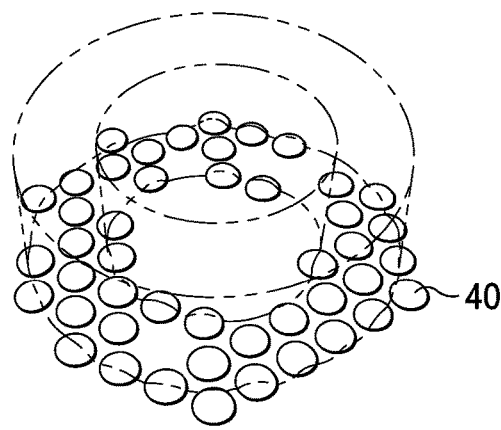
Figure 10D:
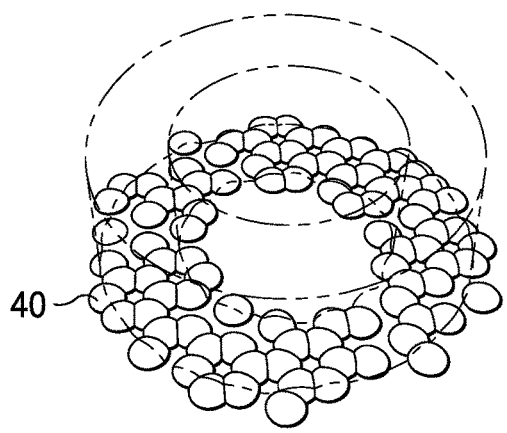
Figure 10E:
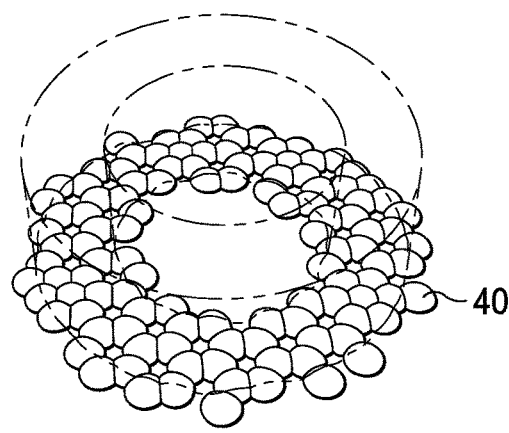
Figure 10F:
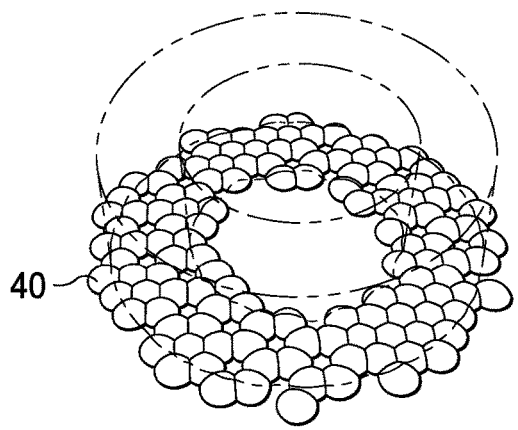
Figure 10G:
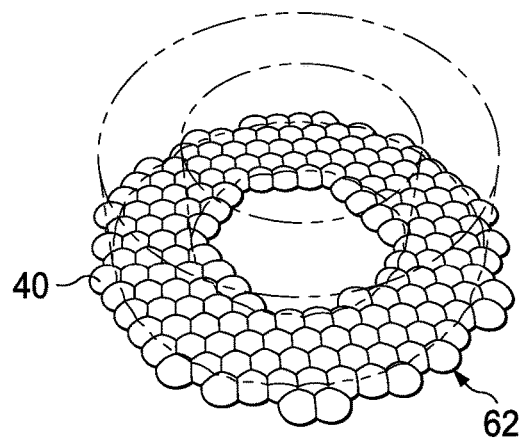

FIGS. 10A-10G show an example deposition process for a layer of a component. The hollow cylinder 60 represents the component to be built. FIG. 10A shows a first deposited cell 40a. In FIG. 10B, a second deposited cell 40b and third deposited cell 40c have been deposited in a non-continuous manner. Each of deposited cells 40a,b,c are spaced apart from each other. FIG. 10C shows additional deposited cells 40 deposited, where each deposited cell 40 remains separate from the other deposited cells 40. As more deposited cells 40 are deposited, the deposited cells 40 become interconnected in a hexagonal array. At first, the array may be of 'hollow' hexagons (e.g., parts of FIGS. 10C and 10D). As the deposition continues, the centers of the 'hollow' hexagons are filled (FIGS. 10D-10G). FIG. 10G shows a completed first layer of deposited cells 40. As can be seen, some deposited cells 40 extend beyond the boundary of the modeled hollow cylinder. To complete the component, additional layers would be deposited on the first layer. In an embodiment where the component is a blank for a part, the component can be post-processed to remove the excess material and reveal the shape of the part (e.g., hollow cylinder 60).

The shape and dimensions of each deposited cell 40 may vary. In an embodiment, the shape of the deposited cells 40 may be generally shaped like a cylinder, clipped sphere, hemisphere, or any other suitable shape. In various embodiments, the average diameter of each deposited cell may be in a range of 0.1 mm to 50 mm, 1 mm to 45 mm, 1 mm to 30 mm, 1 mm to 20 mm, 4 mm to 16 mm, 5 mm to 20 mm, 10 mm to 30 mm, 10 mm to 40 mm, 10 mm to 50 mm, 20 mm to 50 mm, 30 mm to 50 mm, or 40 mm to 50 mm. In some embodiments, the average height of each deposited cell may be in a range of 0.1 mm to 25 mm, 0.1 mm to 20 mm, 0.1 mm to 10 mm, 0.1 mm to 5 mm, 0.5 mm to 5 mm, 0.5 mm to 10 mm, 0.5 mm to 20 mm, 1 mm to 4 mm, 1 mm to 5 mm, 1 mm to 10 mm, 1 mm to 20 mm, 5 mm to 10 mm, 5 mm to 20 mm, 5 mm to 25 mm, 10 mm to 20 mm, or 10 mm to 25 mm. In various embodiments, the diameter to height aspect ratio may vary and may be, for example, at least 1, at least 1.5, at least 2, at least 2.5, at least 3, and at least 5. These shapes and ranges may also apply to the cells in the cellular model.

In an embodiment, the deposited cells 40 may overlap adjacent deposited cells 40. The overlap of a single deposited cell 40 may be based on the percentage of volume that overlaps with any adjacent deposited cell 40. The overlap may be in a range of 0% to 50%, 0% to 40%, 0% to 30%, 10% to 50%, 10% to 40%, 10% to 30%, 20% to 50%, 20% to 40%, or 30% to 50%. In an embodiment, the overlap can be 20%. In some embodiments, there may be a tolerance of +/−10% of the overlap for the deposited cells 40. In another embodiment, the overlap between the deposited cells 40 is based upon the distance by which adjacent deposited cells 40 overlap. This overlap may be in the range of 0% to 50%, 0% to 40%, 0% to 30%, 10% to 50%, 10% to 40%, 10% to 30%, 20% to 50%, 20% to 40%, or 30% to 50% of the radius of the deposited cell 40. In some embodiments, there may be a tolerance of +/−10% for the relative distance of the overlap to the deposited cell radius. These ranges and tolerance may also apply to the cells in the cellular model. It will be appreciated that any suitable overlap is contemplated that reduces cavities in the finished component or otherwise improves the consistency or integrity of the component.

In an embodiment, the size of each deposited cell 40 may be the same. In another embodiment, the deposited cells 40 may have variable sizes. For example, deposited cells 40 at the edge of a layer may be smaller in size than those not adjacent to the edge. FIG. 9 shows an example layer of deposited cells 40 including multiple deposited cell sizes and a non-uniform pattern. In the embodiment shown in FIG. 9, the varying sizes and pattern of the deposited cells 40 is based on circle packing techniques and may vary to optimize the amount of material used, surface finish, deposition rate, or a combination thereof. Cell size and shape may vary cell-to-cell, by layer, by position relative to an axis or center point, or for any other suitable reason.

The edges of each layer may include an overhang or a portion of one or more deposited cells 40 that is unsupported by the layer directly below. An overhang degree may be measured between a line or vector normal direction of the substrate or a lower layer of the component and a vector tangent to the lower leading edge of the overhanging portion of the cell. The overhang degree may be in a range of, for example, 0° to 90°, 0° to 75°, 0° to 60°, 0° to 45°, or 0° to 30°.

Suitable metals include, without limitation, iron, nickel, titanium, copper, aluminum, steel, and alloys, such as stainless steel, austenitic, ferritic, martensitic, precipitation hardening alloys, iron alloys, nickel alloys (e.g., Inconel®), aluminum alloys, copper alloys, and titanium alloys. In one embodiment, each of the deposited cells 40 can be formed of the same material (e.g., welding wire), such that the component is a homogeneous component. In another embodiment, certain of the deposited cells 40 can be formed of a different material such that the metal component can be heterogeneous (e.g., an aluminum component having a portion of steel embedded therein). It is to be appreciated that each particular layer of deposited cells 40 deposited on the weld plate 38 does not need to be completed before depositing additional deposited cells 40 over that layer. The embodiments described herein are not limited to metal components, as discussed further below. Homogenous components can include a center portion having one composition with an outer coating having a different composition, pockets of the component having different compositions, layers of the component having different compositions, or the like.

Figure 11:
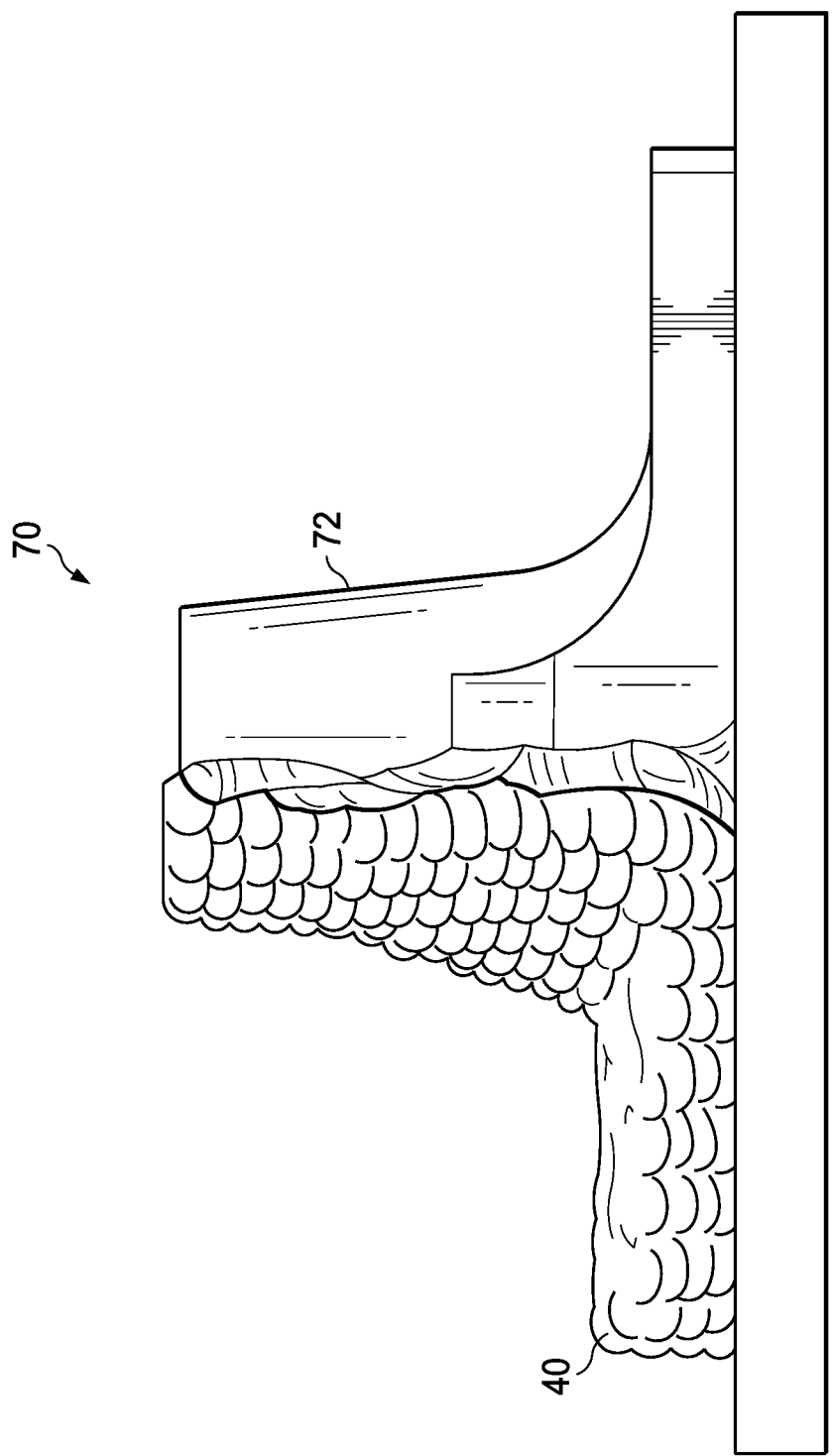
FIG. 11 is a front plan view of a blank during post-process machining in accordance with another embodiment.

Machining a blank formed in accordance with methods described herein can allow for less material that needs to be removed during the milling process, which can lead to significant time and cost savings during manufacturing, while also reducing complexity of the overall additive manufacturing system. As shown in FIG. 11, a blank 70 is shown as built using a non-continuous deposition process as described herein. The blank 70 is shown with portion 72 that has been machined to reveal the shape of the final part. Providing blanks in accordance with embodiments described herein can approximate the shape of a finished part, such that less machining in required, while eliminating or reducing the need for highly granular and complex additive manufacturing systems. In an embodiment, less than 30% of the volume of the blank is removed during machining. In other embodiments, the volume of the blank removed during machining can be in a range of 5% to 40%, 5% to 30%, 5% to 20%, 10% to 40%, 10% to 30%, 15% to 40%, 15% to 30%, or 20% to 40%. In accordance with embodiments described herein, considerable savings can be made even with fairly small components and inexpensive materials. The cost savings grow exponentially with respect to starting billet volume. In addition, using a deposited cell-by-deposited cell, layer-by-layer process can allow for a robot arm having three or four degrees of freedom to be used instead of more complicated and expensive six-degree and seven-degree of freedom robots typically used in conventional metal additive manufacturing processes.

One example of a method for manufacturing a component will now be discussed. First, a computer model of a final part is provided to the controller 36, which identifies the overall shape and size of the metal component that should be fabricated to ensure the final part can be milled or otherwise processed therefrom. The controller 36 can then calculate the optimal deposition order and pattern of the deposited cells 40 to be deposited on the weld plate 38 (e.g., based on heuristics or other conditions such as those discussed further below). The weld plate 38 can be oriented on the welding table 16 and locked in place (e.g., with clamps). The controller 36 can establish a datum (e.g., reference frame) on the substrate 38 which can be a corner or other physical feature. The controller 36 can then operate the welding machine 22 and the articulated robot 26 to begin depositing deposited cells 40 on the weld plate 38 using the datum as a reference frame. During deposition of the deposited cells 40, the controller 36 can monitor various operating characteristics of the welding system 14, such as the voltage and current input at the weld gun 24, for abnormalities that may be indicative of an imperfection in the metal component. If an abnormality is detected, the location of the abnormality (e.g., the deposited cell location) in the component can be flagged for further investigation by the user. Once fabrication of the component is complete, the weld plate 38 can be removed from the welding table 16 and the component can be subsequently milled or otherwise finalized. For example, the post-process machining of a blank may be handled by a CNC milling or turning machine. The datum identified by the controller 36 can be used during the milling process to identify the metal component on the weld plate 38 more easily than with conventional datums (i.e., datums that are integrated into the component itself) which can save significant time and cost. It will be appreciated, however, that systems described herein can be used to manufacture completed parts. For example, components not requiring tight tolerances or a highly specific configuration can be made using embodiments described herein without post-processing or machining. In one embodiment, portions of a component may be machined while other portions of the component may not be finished or otherwise altered.

In various embodiments, multiple components may be constructed in the same deposition process. For example, more than one component may be built in parallel or series, and each component may be built with reference to a single datum. In an embodiment, more than one of the same can be built in parallel or series. In another embodiment, more than one component of different types can be built in parallel or series. As discussed above, each component can be built from a datum or chosen reference point. The build order can then be sorted out to be parallel or series production, after which the cell arrays are sorted. More than one articulated robot 26 may be used.

An example embodiment of software used in the additive manufacturing processes described above includes manipulation of a computer model of the component to be built. A boundary representations (b-rep) model is brought into a build preparation software. The software can then assist the user to quickly orient that model in the machine and plan how the component will be created. The user then chooses a predefined parameter set for the build. The parameters that may be defined include, but are not limited to, layer height, cell height, cell diameter or width, cell aspect ratio, arc on time, wire feed speed, stick out distance, voltage, maximum interpass temperature, overlap distance, overlap percent, deposition time, retraction distance, X-Y-Z positions, i-j-k tool axis vector components and supply or machine characteristics such as program number (a power supply dependent value), arc control (power supply dependent value), work offset (reference frame for the robot), etc. To create the discrete depositions from the component or part model, the software first builds a series of planes separated by the layer height given in the parameter set, and then finds the intersections of each of these planes with the part model. Each of these layers is then covered with an array of cells, such as those described above. In an embodiment, the array is a rectangular array of hexagonally spaced cylindrical cells. Each cell is then checked to determine whether or not to include it in the model. In an embodiment, the program determines what cells are entirely contained within the boundary of the layer. Cells that are contained entirely by the layer contours are included in the model. Next, for any cells not contained entirely by the contours of the layers, the program can determine whether the boundary of the cell intersects the boundary of the layer. The cells having boundaries that don't intersect the layer boundary are not included in the model. For the remaining intersecting cells, the program can determine whether the surrounding cells already cover all of the area of the layer boundary. If a cell is needed to completely cover the area of the layer boundary, that cell is included in the model otherwise it is not included. This process occurs for each layer.

In one alternative embodiment, the discrete depositions are populated through a 2D packing algorithm, rather than being created with an underlying grid. After establishing the intersection curve for each layer, the curves are then filled with uniform sized cells (e.g., cylindrically shaped). The cells may have a defined overlap and an optional programmable tolerance (e.g., +/−10%). Alternatively, in another embodiment, the boundary is filled with circles having a varying diameter with a defined overlap. In another embodiment, the diameter and/or the overlap may vary according to a determined relationship.

In another embodiment, the software does not divide the model into a series of planes, and instead the user selects a starting surface and the contours of the model are filled using a 3D cell packing algorithm. This algorithm can start by building up cells with tool axes built according to the given surface or surfaces. Then additional layers would be created based upon the previous deposition surface or surfaces. This process can repeat until the volume was filled and could be iterated on to optimize packing according to a given metric such as minimizing wasted volume, minimized deviation in overlaps, etc.

The cells can then be rendered, and the user can then preview the initial model superimposed with the planned discrete deposited cells. If the user desires more stock added they can then add an extra padding layer of depositions around the edges, and the model rendered again. Next, the depositions are then sorted as discussed above and passed along to the machine. The user can then choose to export the cellular model (e.g., as a mesh or NURB model) to the CAD or CAM package of their choice for post-process machining and create a build file for the machine. Examples of the software and techniques utilized by the controller 36 are discussed further below.

The process for creating the cell-based architecture can happen very quickly. First, the math for adding offsets or adjusting overhangs is simplified from complicated geometry used in traditional additive or CAD/CAM systems (e.g., where the boundary curves or the actual model geometry needs to be offset and modified and all of the edge cases need to be addressed) to modifying 1D or 2D bitmasks based on whether or not a cell is within the boundary of a layer, as discussed above. This drastic simplification of the planning speeds up the processing dramatically. Next, because each cell can essentially be treated as its own unit, the system can include complete traceability from womb to tomb of each cell within the model. In addition to traceability throughout the build, it also allows for the cells to be the finite elements in the analyses to allow for easier prediction of the results and close the control loop to get the component built correctly the first time. Finally, this simplified model can be passed directly to a CAD or CAM package for post-process machining in any software of choice. This is a simpler, streamlined system that not only removes significant complexity from the conventional process but also enables the user to make better components with less effort. In an embodiment, the system includes machine learning in conjunction with a data acquisition (DAQ) system to improve the processing, such as where data regarding minimizing voids can be used to optimize cell deposition.

Figure 12:
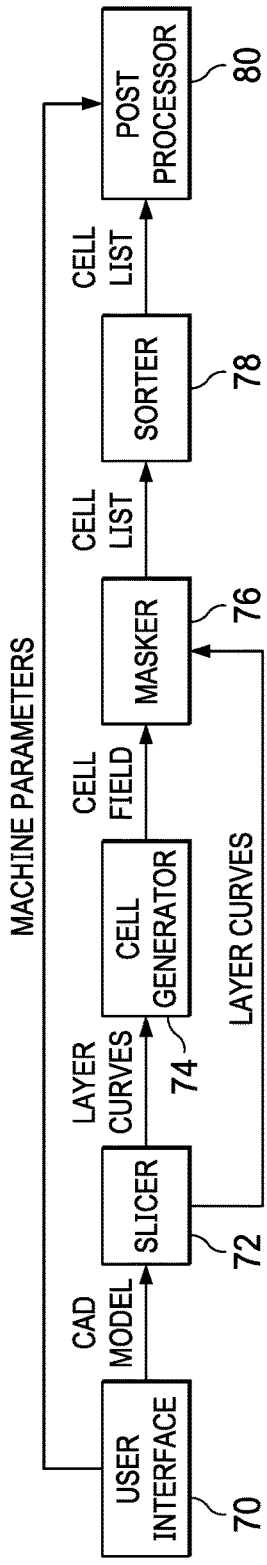
FIG. 12 depicts a software architecture chart in accordance with another embodiment.
Figure 13:
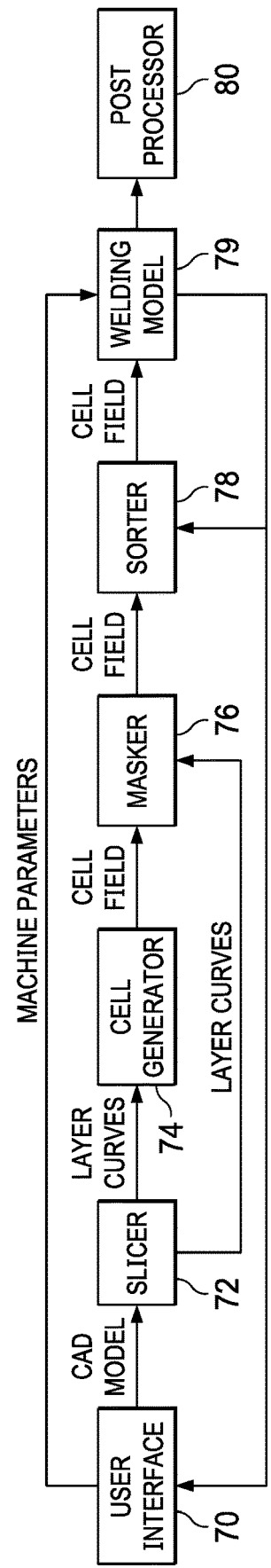
FIG. 13 depicts a software architecture chart in accordance with another embodiment.

FIGS. 12 and 13 depict example embodiments of the high level software architecture that can be used. The user interface 70 may be in an existing system (e.g., an existing CAD or CAM platform, such as Rhinoceros®) and allows the user to pick a parameter set from a predetermined list. In one embodiment, these parameters can be stored in an INI or csv file. The software may be configured for creating, testing, and managing parameter sets. The software can also be configured for version control. In an embodiment, the user may be able to select a bottom face allowing the component to be set up with respect to a known machine datum automatically. The software can check the extents and provide feedback to the user about the current orientation.

The slicer 72 receives the incoming geometry and the given layer height and builds an array of planes through the object layer height away from each other in the Z-direction. It then intersects the model with the planes and creates a series of layers. Each layer is a group of curves on the same plane where the model intersects the plane. These layer curves are passed both to the cell generator 74 as well as the masker object upstream. Once the layer curves are generated, then each layer is passed to the cell generator 74 where a bounding box is generated for the layer and a cell field is generated over the bounding box, and it is extended several multiples of the cell diameter over each edge. The field is represented as, for example, a 1D bitmask array with stored dimensions or a 2D bitmask.

The masker 76 takes the layer curves as well as the bitmask array and creates an equal length 1D bitmask. It then populates the bitmask based on what cells will be used to form the layer, as discussed above, to create the final bit mask array. In an embodiment, the software then checks for intersection to keep cells if the intersecting length is above a predetermined threshold. The user could guide this setup through the GUI. It can also create a bit mask for rendering where the interior volume is removed for a lightweight version. In an embodiment, the cell fields are created as a grid along the X- and Y-axes. The software can be configured to allow the user to manually shift the edges for extruded objects. In an embodiment, the software may be configured to align the cell grid so that it uses the smallest feasible number of cells for a given layer. In another embodiment, the software may be configured to allow for multiple cell sizes and/or non-grid creation by using some circle packing of the layer curves. In some embodiments, the software can be configured to minimize the overhangs by reducing the angle or extrude the furthest overhanging portions down to the build plate. Conventional slicers typically work by intersecting a model with a surface at one point and calling that a layer essentially by extruding that layer up or down. One potential issue with this method is that it can miss any Z feature less than a single layer height. As the layer height increases, this can rapidly cause issues especially if the goal is to always make a stock positive component. To overcome this, in an embodiment, the software is configured to take multiple slices per layer and take the largest version of the superimposed curves to create a more accurate boundary for the layer. In an embodiment, the software treats one cell as one discrete deposition (e.g., one deposited cell 40).

Still referring to FIGS. 12 and 13, the sorter 78 is a sorting object that takes the cell field and converts it into a sorted 1D array of cells. In an embodiments, the cell sorting is a multi-stage system where the field is first divided into three segments in which no cells are directly adjacent (unless there too few cells in a given layer), after which each segment is randomized or sorted, as described below, and then recombined into a single list of cells to be generated within the machine. The number of segments may vary. There may be adjacent, continuous depositions in a layer where there are three or fewer discrete depositions.

The post processor 80 can take a list of cell objects and convert it into commands that are readable by a machine, such as a welding robot. Notably, this may be the only step of the process that may be specific to the type of machine being used. Primarily, it provides the structure for a program and configures and moves through each cell in the list and applies the discrete deposition. In an embodiment, a deposition model, such as welding model 79 can be generated and provided to the post processor 80.

As discussed earlier, the sorting process can be based upon a stack of heuristics. In this system a series of heuristics could be applied to the cell field in which a heuristic gives each cell a weighting factor. The weighting factors for each heuristic are combined per cell, and the system can select the next cell to be deposited by finding the maximum or minimum value depending upon the weighting factors' sense. In this way, the sorting could take into account multiple factors such as, minimized distortion, maximized build rate, minimized thermal input, net cooling rates, maximum interpass temperature, etc., but also be flexible as the component is being built (e.g., as the temperature changes). Additionally, the software can provide a STEP, STL, or other solid output file that can then be used in later stages of processing.

In an embodiment, the system may employ an algorithm or model to predict physical characteristics of the deposited cells and/or the component as a whole. Such physical characteristics include, without limitation, stress, strain, deformation, temperature, deposited cell thermal history, etc. The model can be a finite element analysis model based on the cellular mesh of the component to be produced. Each deposited cell can have an associated heat input based on processing parameters (e.g., voltage, amperage, and arc-on time). The thermal history of the completed component can be predicted by the model based on the order in which cells are sorted and produced within the slicing software. The data from the thermal model can be used to predict thermal strains and residual stresses within the completed component by using the same finite element analysis system.

In various embodiments, the software may be configured to display the expected material properties of the component and/or how long the component will take to build using the chosen parameter set. For example, as discussed above, a model may be used to predict physical characteristics (e.g., in a plot or profile format), which may inform the user in making adjustments to the sorting. Due to the size and organization of the cells, the microstructure of the entire deposited structure (with the exception of the outer surface of the final component) could be controlled by modifying the parameters used to generate each cell. In an embodiment, the software can allow the user to adjust the parameters after the initial cellular mesh is created. This allows the user to iterate with various parameter choices to produce a component that best meets the desired material characteristics. In an embodiment, the discrete deposition process could control the tempering effect on alloy and high carbon steels in order to mitigate crack susceptibility commonly seen in other AM processes. Adjusting the cell generation parameters could also be used to control precipitation reactions in other alloys. The software can be configured to take the generated planes and do as much of the processing from planes to masked cell fields in separate threads or processes to optimize the speed. In an embodiment, the time frame for the software to process and slice a model is less than 0.1 s, which allows the system to be recalculating cell sequences according to data being collected during the build process.

In an embodiment, each cell is traceable. Each cell has a number of associated parameters. For example, the history of what user created the planned cell and when may be stored. The associated parameters can also include what machine was used to build the cell (i.e., perform the discrete deposition to create the deposited cell(s) 40), the time and date of deposition, feedback from any sensors, and comparison with the predictions about that cell. Thus, the system may be able to predict and track defects throughout and tie them back to their root causes.

In an embodiment, process data may be collected and stored. Process data, such as amperage, voltage, and wire feed speed, can be easily captured by using standard welding equipment. This data can be used to continuously monitor cell quality and build a digital twin of the component, which can be used both to reduce non-destructive evaluation (NDE) requirements and as an aid for post-process machining. Data collection will also enable closed-loop control of the process to further increase performance and reliability.

As discussed above, the particular order in which the deposited cells 40 are deposited onto the weld plate 38 can be selected (e.g., sorted) based upon any of a variety of desired heuristics or other conditions. In an embodiment, the order of deposition can be selected to ensure that each deposited cell 40 is never placed next to the deposited cell 40 that was deposited last except where there are too few discrete depositions per layer. In another embodiment, stacked heuristics may be used to give preference to next deposited cells 40 that have a larger distance from the previous deposited cell 40. In yet another embodiment, the order of deposition can be selected to achieve a desired build speed for the metal component (e.g., maximum speed).

In one embodiment, the timing and/or order of deposition can be based upon a profile of physical characteristics of the metal component being manufactured. In such an embodiment, the timing and/or order of deposition can be selected to ensure that each deposited cell 40 is deposited in an area that is cool enough to receive the deposited cell 40. To that end, in some embodiments, the interpass temperature (i.e., temperature of the metal component prior to an additional deposited cell being welded to the metal component) can be controlled based on, for example, the timing of each weld or the order of deposition. Control of the interpass temperature affects the desired geometric shape and material properties of the metal component. Multiple techniques may be used to control the interpass temperature, as discussed below, and more than one technique may be used at a time. In an embodiment, the fabrication process includes a time-based delay between welding of each deposited cells 40. For example, the deposited cells 40 may be applied periodically. The time-based delay may be based on, for example, the interplay between the cross-sectional area of the sliced component in the current deposition surface (e.g., the surface area of the layer currently being deposited, in mm$^2$), the temperature of the metal component (e.g., measured or predicted in ° C.), and a delay time (e.g., in seconds). As the cross-sectional area decreases, the temperature of the component was observed to increase. Delaying the welding of the next deposited cell 40 reduces the overall heat input and, consequently, the temperature of the metal component. Smaller cross-sectional areas may require longer delays between each weld. The time-based delay between the welding of each deposited cell 40 may be on the order of seconds. For example, the delay between each weld may be on the order of seconds in the single digits. The length of the delay may be constant or may vary over time. In an embodiment, the length of the time delay can vary based on changing characteristics of the component as it is built. For example, the length of the time delay can be adjusted based on changes in component temperature, the cross-sectional area of the current layer being deposited, energy input associated with the deposition parameters of each deposited cell 40.

In some embodiments, a predictive algorithm or model, such as one discussed above, may be used to determine or adjust the deposition order and timing. Using such an algorithm or model, the sorting and timing of the deposition of each deposited cell 40 may be determined or adjusted to reach a goal, such as minimizing thermal gradients throughout the component, maintaining a certain cooling rate, reducing or evening out residual stress, or producing maximum overhang. The algorithm or model may be adjusted based on feedback of the build process.

In another embodiment, the timing and/or order of depositions can be controlled based on feedback from the welding system 14. For example, the welding system 14 may include a temperature sensing device associated with the controller 36. The temperature sensing device may be, for example, coupled to the weld gun 24 or the articulated robot 26. Examples of the temperature sensing device include, without limitation, an optical pyrometer, an infrared (IR) thermometer, etc. The temperature sensing device is configured to measure the temperature of the welding pool. The user may define a maximum interpass temperature. The maximum interpass temperature may vary and, in some embodiments, may be in a range of 0° C. to 2000° C., 0° C. to 1000° C., 0° C. to 500° C., 0° C. to 100° C., 100° C. to 500° C., 100° C. to 1000° C., 100° C. to 2000° C., 200° C. to 500° C., 200° C. to 1000° C., or 200° C. to 2000° C. When the weld gun 24 is moved to the next position, controller 36 receives the newly measured temperature form the temperature sensing device. If the temperature is below the maximum interpass temperature, the weld gun 24 can weld the next deposited cell 40. If the measured temperature is above the maximum interpass temperature, the system may perform one of two operations. First, the controller 36 may delay the next weld until the measured temperature is below the maximum interpass temperature. Second, the controller 36 may move on to the next planned cell in the program, with the intent of returning to the skipped cell at a later time, which allows the portion of the metal component that is too hot to cool down prior to welding the skipped cell. Thus, because any delay between welding the deposited cells 40 is based on temperature, the time between each weld may vary (e.g., not be periodic).

In another embodiment, the temperature sensing device may include a thermal imaging camera. The thermal imaging camera can be configured to measure the temperature of a relatively larger portion (e.g., compared to an optical pyrometer) or the entirety of the metal component. The controller 36 may be configured to determine whether the temperature of the area intended for the next deposited cell 40 is above or below the maximum interpass temperature as discussed above. Additionally, because the temperature of a larger portion of the metal component is being analyzed, the controller 36 may be configured to measure and analyze localized thermal trends. The thermal trends may affect the order of the upcoming welds. If, for example, the controller 36 sees that the area for an upcoming weld is above the maximum interpass temperature, the controller 36 may proactively move to the next weld that has a temperature below the maximum interpass temperature.

While the above embodiments are described in a welding application, the technology is not so limited. The benefits of simplifying programming, reducing thermal stresses and distortion, and reducing personnel/operating costs apply across many applications. The embodiments as described above may be applied in additive manufacturing applications such as laser/powder directed energy deposition, laser/wire directed energy deposition, laser powder bed fusion, binder jetting, cold spray, or a combination thereof. While the embodiments as described above are directed to metal materials, the materials useful in the embodiments can include, without limitation, metals, alloys, ceramics, plastics, composites, glass, and a combination thereof. Further, these techniques may be applicable in painting, repair, and other robotic sorting applications.

Testing was performed using a 6-axis robotic weld cell with a GMAW power supply using 0.045" diameter ER7OS filler wire with 15 mm stick out and a 90/10 Argon/$CO^2$ shielding gas flowing at 25 CFH. Four separate tests were performed: 1) a DoE varying wire feed speed and arc on time to understand the variety of cell sizes possible with the process, 2) a series of 100 cells using identical parameters in order to characterize repeatability of the process, 3) tests varying the overlap and positioning of cells required to build a three-dimensional block, and 4) a comparison of residual stress and distortion between the proposed architecture and a standard WAAM process. With the exception of the stress test, all tests used 6"×6"×0.375" hot rolled A36 steel base plates.

Example 1

Summary of Initial Process Development 2.2.1 Cell Size DoE

Arc-on time and wire feed speed were varied to evaluate the range of cell sizes that could be generated by the equipment in the welding cell. Arc-on times ranged from 100 to 1,000 milliseconds (ms) in 100 ms increments, while wire feed speeds were varied from 100 to 300 inches per minute (ipm) in 50 ipm increments. The test was performed twice and the average height, diameter, and aspect ratio of each combination of arc-on time and wire feed speed was calculated.

Cell size (both diameter and height) increased with respect to both time and wire feed speed. Diameters ranged from 2.85 to 7.3 mm, while the average height ranged from 0.95 to 3.12 mm. This wide range of cell sizes suggests that there is a wide process window that can be utilized to fine tune the cells not only in terms of size, but in terms of heat input and microstructure. The diameter to height aspect ratios ranged from 1.72 to 3.38, with the largest aspect ratios correlated to cells produced with short arc-on times and high wire feed speeds. While aspect ratios of 4 to 5 are suggested to be the minimum allowed to avoid macroscopic lack of fusion between weld beads, the relatively low aspect ratios observed were attributed to the "cold" nature of the short circuiting CMT process. The aspect ratio could be increased by changing wire feed speed, stick out, and shielding gas in order to change the arc characteristics away from a short circuit and towards a spray, globular, or pulsed mode. Some voids were present on top of larger cells suggesting that the base plates were dirty and/or insufficient shielding gas was present. This is unsurprising as the weld cell automatically turned the gas on and off during the move time between each cell. Running the shielding gas continuously to maintain an inert environment surrounding the process may prevent such voids.

Example 2

Two sets of parameters (i.e., "small" and "large") "were down-selected from Example 1 to continue testing. Both cell sizes were generated using a wire feed speed of 300 ipm, with an arc-on time of 100 ms for the small cells and 900 ms for the large cells. 100 cells were produced with each set of parameters, and the heights and diameters were measured with calipers. Average heights, diameters, and aspect ratios were calculated.

Statistical analysis for both sets of cell sizes showed a relatively normal distribution in terms of diameter, height, and aspect ratio. The average diameter and height of the 100 ms cells were 4.69 and 1.33 mm respectively, while the 900 ms cells had an average height and diameter of 7.42 and 3.06 mm respectively.

Three sigma manufacturing control analysis for each of the two sizes shows that the process is controllable, as none of the cells measured were found to fall outside of the control limits. The manufacturing control plot of the small cells shows no trends with respect to the order in which cells were generated. This is likely due to the low heat input generated by these cells, as the manufacturing control plot for the large cells shows that the cell aspect ratio increased as additional cells were produced. The diameter remained the same, while the cell height decreased as additional cells were produced. An increase in the starting temperature means that there is excess thermal energy in the deposition (i.e., the energy input from the GMAW process remains constant), which melts more of the material around the cell, thus increasing the diameter while reducing height. Thus, it was inferred that the overall temperature of the plate increased as the test progressed due to the higher heat input used to generate large cells.

Example 3

Once the average diameter and height were calculated for each set of parameters, the slicing software was implemented to write code to test the effects of cell overlap and stacking on the architecture's ability to build three dimensional blocks. Cell placement was randomized by the slicing software within a hexagonal array, while cell overlaps were varied from 0-40% of the cell diameter for both small and large cells. Thin two-layer blocks were built first to determine a visually acceptable level of overlap, followed by a full size block measuring 25 mm×100 mm×12 mm. The final block was then cross sectioned and polished using standard metallographic techniques for macro- and microscopic evaluation.

The first overlap tests were performed with the small 100 ms cells. The cells rapidly placed in close proximity resulted in a propensity to agglomerate and become asymmetric. An initial assumption was made during testing that the agglomeration was due to the low heat input of the small cells, and no further testing was performed with the small cells at that time. Overlap testing performed with the larger 900 ms cells showed visually acceptable results at a 20% overlap of cell diameter (i.e., overlap of the cells within the same layer). The initial layers of the large block had a much rougher upper surface than the final layer of the full-size block. This effect was reduced in the full size block as the overall temperature of the component increased during the build. In-situ human observation of the process revealed that the agglomeration effect seen in the small cells was still occurring when cells were generated in close proximity, regardless of the layer. The last cells deposited in each layer were observed to wet evenly to all sides as they filled in divots left by the surrounding hexagonally patterned cells. This suggests that the agglomeration effect can be overcome by changing the order in which cells are deposited from a fully random sorting to a semi-randomized sorting pattern which will ensure that no two cells are generated immediately in close proximity.

Macroscopic evaluation of the block revealed a welding defect—lack of fusion—between cells. The lack of fusion appeared to be more frequent on the initial layers of the build, likely due to the lower overall temperature of the component. This is not surprising, as the CMT process uses the short-circuit transfer mode, which is prone to lack of fusion. Lack of fusion in the cell-arc process can be overcome by changing the aspect ratio of each individual cell or increasing the heat input of the process by changing to different GMAW transfer mode such as spray transfer.

Microscopic evaluation showed that the steel microstructure underwent significant recrystallization as it is reheated by the cells surrounding it on all sides. The recrystallization occurred as underlying cells were reheated and tempered, thus forming a highly desirable tough, fine grained microstructure.

Example 4

Magnitudes of residual stress were compared between blocks built with three different cell parameter sets (Inventive Examples 1-3) and a conventional low-heat input CMT linear weld (Comparative Example). For each of Inventive Examples 1-3 (IE1-IE3) and the Comparative Example (CE), long, thin blocks measuring 0.5"×10"×0.5" were each produced on a 2"×12"×0.125" plate to minimize the restraint provided by the base plate and maximize distortion generated by the block. Each build plate was weighed before and after each block was deposited, and the total time required to build each block and the final temperature of each sample were recorded. Energy input was calculated based on welding parameters and known arc and melting efficiencies for the GMAW process. Table 1 shows various process parameters for IE1-IE3 and CE.

TABLE 1

| Block | Arc On Time (ms) | Duty Cycle (%) | Wire Feed Rate (ipm) | Total # Cells | Travel Speed (mm/s) | Deposit Speed (mm/s) | Amperage (A) | Voltage (V) |
|---|---|---|---|---|---|---|---|---|
| IE1 | 100 | 17.8 | 300 | 2860 | 450 | N/A | 203 | 13.1 |
| IE2 | 500 | 52 | 300 | 750 | 450 | N/A | 203 | 13.1 |
| IE3 | 900 | 66.1 | 300 | 420 | 450 | N/A | 203 | 13.1 |
| CE | N/A | 100 | 100 | N/A | N/A | 3 | 88 | 10.4 |

| Block | Total Energy Input (J) | Energy per Cell (J) | Energy Density (J/mm³) | Build Time (min) | Final Temp (° C.) | Material Deposited (lb) | Deposition Rate (lb/hr) | Measured Distortion |
|---|---|---|---|---|---|---|---|---|
| IE1 | 380280 | 133 | 11.45 | 50 | 320 | 0.577 | 0.69 | 1.2 |
| IE2 | 498619 | 665 | 14.69 | 18 | 540 | 0.590 | 1.97 | 0.6 |
| IE3 | 502608 | 1197 | 15.44 | 13 | 535 | 0.566 | 2.61 | 0.3 |
| CE | 686400 | N/A | 23.43 | 25 | 270 | 0.509 | 1.22 | 3 |

Distortion was measured by placing the each sample on a flat surface and measuring the amount of deflection between the surface and the high points of each build plate. Test results showed that IE3 exhibited the lowest amount of distortion, thus containing the least residual stress of all samples. Distortion was found to increase as the arc on time per cell diminished. CE contained the largest amount of distortion. The total energy inputs, deposited weight, and volume of all samples used to produce all samples were approximately equal. The duty cycle and energy input per cell were strongly correlated to the final temperature, and inversely related to the measured distortion of each sample. While the total energy input, energy density, and final temperature of IE2 and IE3 were approximately equal, the energy per cell in IE3 was twice that of IE2, while the distortion measured in IE3 was half that of IE2. This suggests that the energy input per cell is influential in controlling residual stress.

The most critical factors affecting residual stress in this test were energy input per cell and the ratio of the weld bead area to the area of surrounding material. In light of these test results, without being bound by theory, the residual stress was reduced substantially in the cellular, non-continuously deposited samples, IE1-IE3, compared to the linear sample, CE, for two primary reasons: 1) the temperature gradient between each cell and the component is lower than traditional linear welding processes thanks to the ability of the randomized cell architecture to distribute energy evenly throughout a component, and 2) the lack of linear stress buildup during deposition by eliminating linear deposition paths in favor of even distributed small, circular weld beads. The cell-based architecture resulted in substantially lower residual stresses than the conventional arc-based DED processes, and residual stress and distortion can be controlled by controlling the amount of energy input per cell.

In various embodiments disclosed herein, a single component can be replaced by multiple components and multiple components can be replaced by a single component to perform a given function or functions. Except where such substitution would not be operative, such substitution is within the intended scope of the embodiments.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended that the scope be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A method of manufacturing using an additive manufacturing process, the method comprising:
   (a) providing a deposition system, the deposition system configured to provide a plurality of cells to form a blank of a part, wherein the blank comprises a plurality of layers;
   (b) with a processor, building a toolpath that includes instructions for an ordered sequence of discrete deposition events that correspond to the plurality of cells, wherein:

(i) each discrete deposition event of the ordered sequence of discrete deposition events describes the placement of a single deposited cell;
(ii) building the toolpath includes determining an order of the ordered sequence of discrete deposition events while enforcing a non-continuous deposition rule that prevents the single deposited cell from being placed adjacent to an immediately precedent single deposited cell; and
(iii) the ordered sequence of discrete deposition events ensures adjacency for a plurality of adjacent cell groupings within a layer of the plurality of layers while enforcing the non-continuous deposition rule, wherein each of the plurality of adjacent cell groupings comprise a cell of the plurality of cells that is adjacent to at least one other cell of the plurality of cells within the layer;
(c) with the deposition system and based on the ordered sequence of discrete deposition events of the toolpath, depositing a first layer of the blank, the first layer comprising a first plurality of deposited cells that are placed in compliance with the non-continuous deposition rule; and
(d) with the deposition system and based on the ordered sequence of discrete deposition events of the toolpath, depositing a second layer of the blank on the first layer, the second layer comprising a second plurality of deposited cells that are placed in compliance with the non-continuous deposition rule; and
(e) prior to placing each single deposited cell:
(i) receiving a location temperature from a temperature sensing device, wherein the location temperature describes the present temperature at a location that is associated with that single deposited cell by the toolpath; and
(ii) where the location temperature exceeds a defined maximum interpass temperature, perform an interpass temperature intervention comprising, while enforcing the non-continuous deposition rule, reordering the ordered sequence of discrete deposition events so that that single deposited cell is positioned later in the ordered sequence of discrete deposition events.

2. The method of claim 1, further comprising building the toolpath based on one or more heuristics.

3. The method of claim 1, further comprising building the toolpath based on a predicted physical characteristic selected from the group consisting of stress, strain, deformation, temperature, deposited cell thermal history, and combinations thereof.

4. The method of claim 1, further comprising building the toolpath to maximize space between a deposited cell most recently deposited and a next deposited cell to be deposited.

5. The method of claim 1, wherein the first layer, after completion, comprises a plurality of deposited cells arranged in a grid pattern.

6. The method of claim 1, wherein the first layer, after completion, comprises a plurality of overlapping deposited cells.

7. The method of claim 1, wherein the deposition system is operably configured to provide a material selected from the group consisting of a metal, an alloy, a plastic, a composite, a glass, and a combination thereof.

8. The method of claim 1, wherein the deposition system is a welding system.

9. The method of claim 1, further comprising machining the blank to form the part.

10. The method of claim 9, wherein machining the blank comprises removing less than 30 percent of the blank to form the part.

11. The method of claim 1, further comprising beginning to deposit the second layer before completing deposit of the first layer, wherein the non-continuous deposition rules prevents the single deposited cell from being placed adjacent to the immediately precedent single deposited cell, whether on a same layer of the blank or on a different layer of the blank.

12. The method of claim 1, further comprising, while building the toolpath:
(a) executing a predictive model based upon a set of specifications describing the blank of the part and the performance of the deposition system; and
(b) determining an order and a timing of each discrete deposition event based upon the predictive model and a configured goal to minimize thermal gradient throughout the blank of the part during deposition.

* * * * *